US012632970B2

(12) United States Patent
Yanamala

(10) Patent No.: US 12,632,970 B2
(45) Date of Patent: May 19, 2026

(54) SYSTEMS AND METHODS FOR FEATURE-BASED FORWARD COLLISION DETECTION

(71) Applicant: NETRADYNE, INC., San Diego, CA (US)

(72) Inventor: Suresh Babu Yanamala, Bengaluru (IN)

(73) Assignee: NETRADYNE, INC., San Diego, CA (US)

( * ) Notice: Subject to any disclaimer, the term of this patent is extended or adjusted under 35 U.S.C. 154(b) by 110 days.

(21) Appl. No.: 18/579,163

(22) PCT Filed: Jul. 15, 2022

(86) PCT No.: PCT/US2022/037268
§ 371 (c)(1),
(2) Date: Jan. 12, 2024

(87) PCT Pub. No.: WO2023/288049
PCT Pub. Date: Jan. 19, 2023

(65) Prior Publication Data
US 2024/0354964 A1 Oct. 24, 2024

(30) Foreign Application Priority Data
Jul. 16, 2021 (IN) .............................. 202111032154

(51) Int. Cl.
*G06T 7/246* (2017.01)
*G06V 10/44* (2022.01)
*G06V 20/58* (2022.01)

(52) U.S. Cl.
CPC ............ *G06T 7/246* (2017.01); *G06V 10/443* (2022.01); *G06V 20/58* (2022.01); *G06T 2207/30252* (2013.01)

(58) Field of Classification Search
CPC ........... G06T 7/246; G06T 2207/30252; G06T 2207/10024; G06T 2207/10048;
(Continued)

(56) References Cited

U.S. PATENT DOCUMENTS

| | | | |
|---|---|---|---|
| 9,946,960 B1 * | 4/2018 | Kim | G06N 3/08 |
| 2015/0243044 A1 * | 8/2015 | Luo | G06T 7/246 |
| | | | 382/107 |

(Continued)

FOREIGN PATENT DOCUMENTS

| | | | |
|---|---|---|---|
| EP | 3576007 A1 | 9/2023 | |
| WO | WO-2021126074 A1 * | 6/2021 | G06V 20/36 |

OTHER PUBLICATIONS

International Search Report and Written Opinion in International Patent Application No. PCT/US2022/037268 Oct. 18, 2022, 8 pages.

(Continued)

*Primary Examiner* — Frederick M Brushaber

(57) ABSTRACT

Disclosed herein are systems and methods for tracking objects to detect a potential collision with a vehicle. A computing device can receive a first frame and a second frame captured by a capture device mounted to the vehicle. The computing device can then identify first points of interest corresponding to an object identified in the first frame and second points of interest corresponding to the object identified in the second frame. The computing device can then generate a transformation matrix that specifies a transformation of the first points of interest to the second points of interest. The computing device can then determine, based on the transformation matrix, a score corresponding to a potential collision event, and transmit a collision signal to a collision alert device responsive to the score satisfying a potential collision event threshold.

12 Claims, 8 Drawing Sheets

(58) Field of Classification Search
CPC ........ G06T 2207/20084; G06V 10/443; G06V
20/58; G06V 20/56
See application file for complete search history.

(56) References Cited

U.S. PATENT DOCUMENTS

| | | | |
|---|---|---|---|
| 2017/0061229 A1* | 3/2017 | Rastgar ................... | G06T 7/248 |
| 2020/0380274 A1* | 12/2020 | Shin ........................ | G06T 7/292 |
| 2021/0342790 A1* | 11/2021 | Dagley ................... | G06T 11/60 |
| 2022/0138475 A1* | 5/2022 | Chowdhury ......... | G06V 10/751 |
| | | | 382/103 |
| 2022/0198753 A1* | 6/2022 | Sawhney ............... | G06T 19/00 |

OTHER PUBLICATIONS

Communication pursuant to Article 94(3) EPC in EP Patent Application No. 22754225.5 dated Sep. 29, 2025, 8 pages.
Ren, et al., "Faster R-CNN: Towards Real-Time Object Detection with Region Proposal Networks," IEEE Transactions on Pattern Analysis and Machine Intelligence, Jun. 2017, vol. 39, No. 6, pp. 1137-1149.

* cited by examiner

300B

ALIGNED FRAMES 320

300A

CORRESPONDENCE 310

CURRENT FRAME 210

POINT OF INTEREST 305

BOUNDING REGION 315

PREVIOUS FRAME 205

400

405 — RECEIVE FRAMES FROM CAPTURE DEVICE

410 — IDENTIFY POINTS OF INTEREST IN EACH FRAME

415 — GENERATE TRANSFORMATION MATRIX

420 — DETERMINE POTENTIAL COLLISION SCORE

SCORE SATISFIES THRESHOLD? — 425
N
Y

430 — TRANSMIT COLLISION SIGNAL TO COLLISION ALERT DEVICE

SYSTEMS AND METHODS FOR FEATURE-BASED FORWARD COLLISION DETECTION

CROSS-REFERENCE TO RELATED APPLICATION

This application is a U.S. National Phase Application under 35 U.S.C. § 371 of International Patent Application No. PCT/US22/37268, filed on Jul. 15, 2022, which claims the benefit of and priority to IN Provisional Patent Application No. 202111032154, filed on Jul. 16, 2021, the contents of which are incorporated herein by reference in their entireties.

TECHNICAL FIELD

This application relates generally to using computer vision techniques to estimate a collision event with a vehicle in a driving environment.

BACKGROUND

Accurately estimating the amount of time to a potential collision event is important to driver performance monitoring and autonomous vehicle navigation. Conventional computer vision systems estimate time-to-collision based on simple object recognition over a series of image frames. However, systems that solely rely on simple object recognition techniques often fail to consistently and accurately estimate distance to moving objects in a changing, real-time environment.

SUMMARY

Conventional object detection systems use bounding boxes, which represent a boundary between the detected object and other features of an image, to track object size between subsequent frames. In particular, conventional forward-collision detection techniques may rely on estimations of the size of features of potential obstacles, rather than detecting and classifying those objects in their entirety. These features can include, for example, edges, taillights, or headlights of another vehicle, or a bounding box that surrounds a detected obstacle. The scale of these obstacle features, when measured across frames, may then be used to estimate the width of the obstacle, and ultimately estimate a time-to-collision with the obstacle. However, merely relying on the detection of a small set of features to estimate a scale of a potential obstacle introduces significant errors in time-to-collision estimates.

For example, inherent noise in conventional object detection techniques introduce a "bounding box breathing" phenomenon, where the size of bounding boxes representing detected objects change inconsistently between frames. Because collision detection algorithms depend on accurate estimations of the change in object size between frames, the breathing bounding box problem can cause false collision warnings or, in some circumstances, fail to provide an alert for a potential collision in time for a response. In a real-time driving environment, failure to detect potential collisions with obstacles can have catastrophic consequences.

Therefore, there is a desire for a system to track objects accurately and in real-time, such that potential collision events between a camera-mounted vehicle and potential obstacles can be detected while the vehicle is driving. The systems described herein improve upon the conventional techniques outlined above by using a neural network regression model to estimate a bounding box around a detected object, and then identify features within the bounding box that match corresponding features in a bounding box of a subsequent frame. A transformation matrix is then generated that aligns the identified features with the matching features of the subsequent frame, and a scaling factor is extracted from the transformation matrix. The scaling factor is used to estimate a time-to-collision with the detected object. By accurately tracking and aligning features across different frames, rather than simply relying on a change in scale of a bounding box or simple features, the systems and methods described herein can track objects in a sequence of frames in real-time with sub-pixel accuracy while being highly robust to noise.

At least one aspect of the present disclosure is directed to a method. The method can include a method for tracking objects to detect a potential collision with a vehicle. The method can be performed, for example, by one or more processors coupled to memory. The method can include receiving a first frame and a second frame captured by a capture device mounted to the vehicle. The method can include identifying a first plurality of points of interest corresponding to an object identified in the first frame, and a second plurality of points of interest corresponding to the object identified in the second frame. The method can include generating a transformation matrix that specifies a transformation of the first plurality of points of interest to the second plurality of points of interest. The method can include determining, based on the transformation matrix, a score corresponding to a potential collision event. The method can include transmitting a collision signal to a collision alert device responsive to the score satisfying a potential collision event threshold.

In some implementations of the method, identifying the first plurality of points of interest corresponding to an object identified in the first frame can include calculating a plurality of Harris corners for the first frame based on pixels in the first frame. In some implementations of the method, generating the transformation matrix can include detecting a first region of the first frame corresponding to the object. In some implementations of the method, generating the transformation matrix can include selecting a first subset of the first plurality of points of interest within the first region. In some implementations of the method, generating the transformation matrix can include calculating the transformation matrix based on the first subset. In some implementations, the method can include selecting a second subset of the second plurality of points of interest within a second region of the second frame. In some implementations, the method can include calculating the change in scale between the first frame and the second frame based on a displacement between the first subset and the second subset.

In some implementations of the method, the score includes an estimated time-to-collision. In some implementations of the method, determining the score corresponding to the potential collision event further includes calculating the estimated time-to-collision based on a scaling factor of the transformation matrix. In some implementations, the method can include determining that the score satisfies the collision event threshold by determining that the estimated time-to-collision is less than the potential collision event threshold.

In some implementations, the method can include receiving a third frame captured by the capture device. In some implementations, the method can include generating a second transformation matrix based on the second frame and the third frame. In some implementations, the method can include updating the score based on the second transformation matrix. In some implementations, the method can include determining a first class of the object as depicted in the second frame and a second class of the object as depicted in the third frame. In some implementations, the method can include comparing the first class of the object as depicted in the second frame to the second class of the object as depicted in the third frame. In some implementations, the method can include storing an indication of a detection failure event in association with a timestamp corresponding to when the second frame was captured by the capture device.

In some implementations, the method can include receiving a third frame captured by the capture device. In some implementations, the method can include determining that calculating a second transformation matrix between the second frame and the third frame has failed. In some implementations, the method can include storing an indication of a detection failure event in association with a timestamp corresponding to when the second frame was captured by the capture device. In some implementations of the method, generating the transformation matrix can include executing a Kanade-Lucas-Tomasi (KLT) feature tracking technique based on the first plurality of points.

At least one other aspect of the present disclosure is directed to a system for tracking objects to detect a potential collision with a vehicle. The system can include one or more processors coupled to a memory. The system can receive a first frame and a second frame captured by a capture device mounted to the vehicle. The system can identify a first plurality of points of interest corresponding to an object identified in the first frame, and a second plurality of points of interest corresponding to the object identified in the second frame. The system can generate a transformation matrix that specifies a transformation of the first plurality of points of interest to the second plurality of points of interest. The system can determine, based on the transformation matrix, a score corresponding to a potential collision event. The system can transmit a collision signal to a collision alert device responsive to the score satisfying a potential collision event threshold.

In some implementations, the system can identify the first plurality of points of interest corresponding to an object identified in the first frame by performing operations comprising calculating a plurality of Harris corners for the first frame based on pixels in the first frame. In some implementations, the system can generate the transformation matrix by performing operations including detecting a first region of the first frame corresponding to the object. In some implementations, the system can generate the transformation matrix by performing operations including selecting a first subset of the first plurality of points of interest within the first region. In some implementations, the system can generate the transformation matrix by performing operations including calculating the transformation matrix based on the first subset. In some implementations, the system can select a second subset of the second plurality of points of interest within a second region of the second frame. In some implementations, the system can calculate the change in scale between the first frame and the second frame based on a displacement between the first subset and the second subset.

In some implementations, the score comprises an estimated time-to-collision. In some implementations, the system can determine the score corresponding to the potential collision event by performing operations comprising calculating the estimated time-to-collision based on a scaling factor of the transformation matrix. In some implementations, the system can determine that the score satisfies the collision event threshold by determining that the estimated time-to-collision is less than the potential collision event threshold. In some implementations, the system can receive a third frame captured by the capture device. In some implementations, the system can generate a second transformation matrix based on the second frame and the third frame. In some implementations, the system can update the score based on the second transformation matrix.

In some implementations, the system can determine a first class of the object as depicted in the second frame and a second class of the object as depicted in the third frame. In some implementations, the system can compare the first class of the object as depicted in the second frame to the second class of the object as depicted in the third frame. In some implementations, the system can store an indication of a detection failure event in association with a timestamp corresponding to when the second frame was captured by the capture device. In some implementations, the system can receive a third frame captured by the capture device. In some implementations, the system can determine that calculating a second transformation matrix between the second frame and the third frame has failed. In some implementations, the system can store an indication of a detection failure event in association with a timestamp corresponding to when the second frame was captured by the capture device. In some implementations, the system can generate the transformation matrix by performing operations comprising executing a KLT feature tracking technique based on the first plurality of points of interest.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

DETAILED DESCRIPTION

Figure 1A:
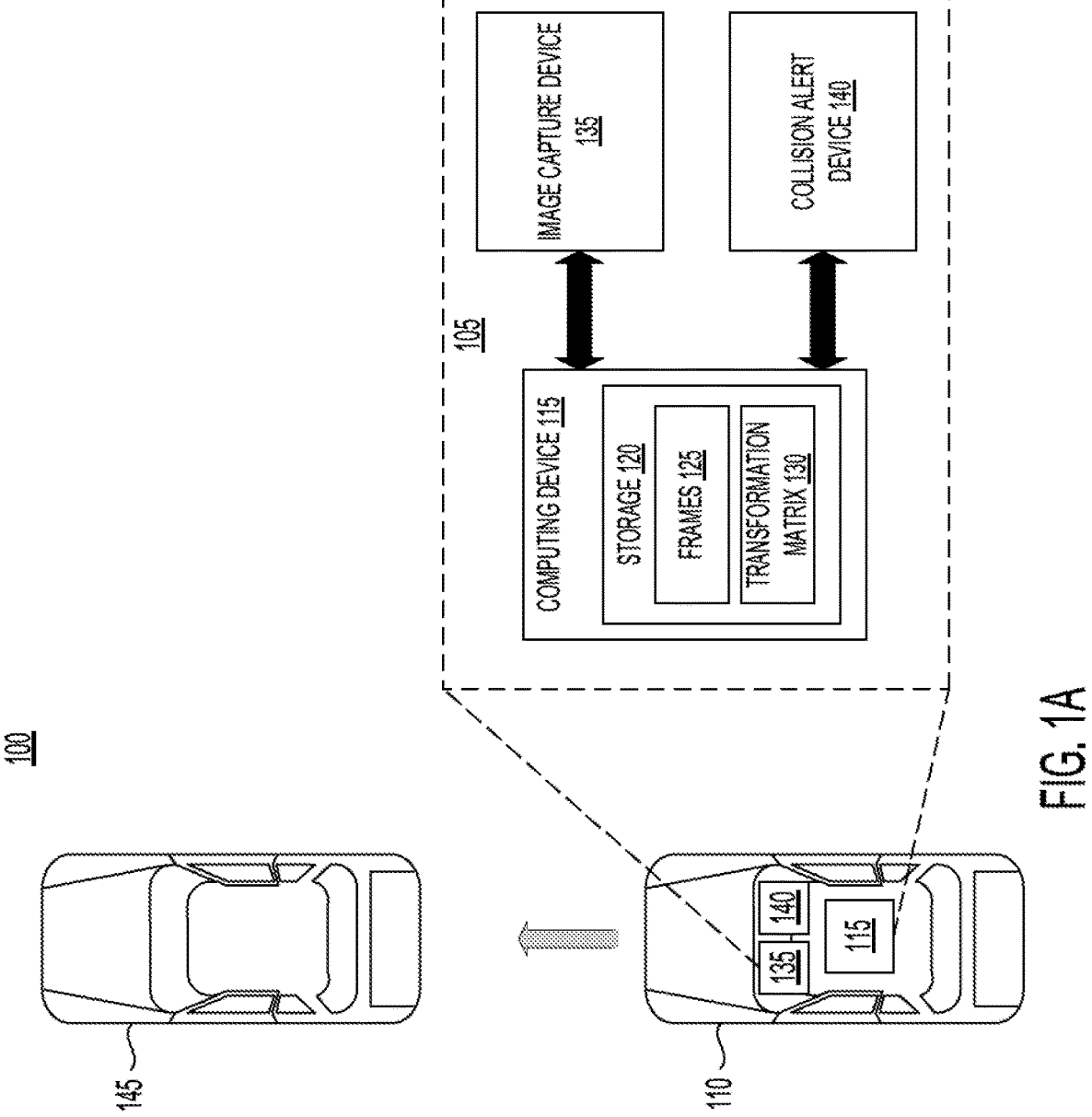
FIG. 1A illustrates components of a system for tracking objects to detect a potential collision with a vehicle, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

Detecting potential collision events while vehicles are driving is an important feature for both driver assessment systems and for autonomous vehicle control systems. Conventional designs that detect potential forward collision events often use one or more cameras positioned on a vehicle and perform rudimentary image processing to detect and track obstacles over time. However, conventional object tracking techniques often produce significant noise in object size estimation. In such systems, the change in detected object size, often calculated from a bounding box surrounding the detected object, is used to predict object distance. However, bounding box detection alone often introduces variation in bounding box size across sequential frames, where the size of the bounding box surrounding a detected obstacle changes in size inconsistently. The breathing bounding box is caused by inherent inaccuracies in conventional object detection techniques. In a real-time driving scenario, these errors in detecting bounding box size can cause false warnings for autonomous vehicle control systems, or in some cases, fail to detect when an object collision is imminent.

By implementing the improved object tracking and detection techniques described herein, these noise issues are reduced significantly, thereby improving the accuracy of collision event detection in driving environments. To do so, the systems and methods described herein provide additional feature tracking and image alignment techniques that, when used in combination with bounding-box object detection techniques, provide significant improvements to object size tracking between frames in a video or image stream. By tracking features between frames within bounding boxes that correspond to potential collision hazards (e.g., obstacles, vehicles, etc.), the systems and methods described herein can generate a transformation matrix that specifies a transformation between points of interest in a first frame and points of interest in a second frame. A transformation matrix can be calculated iteratively, for example, every time a frame is received from a capture device.

The system and methods described herein can use the transformation matrix to determine an accurate change in scale between an object of interest (e.g., an obstacle or vehicle, etc.) from a first frame in a video stream or stream of images to a second, subsequent frame. The change in scale of the object of interest can then be used to derive an amount of time until a potential collision event. If the amount of time is less than a predetermined threshold, the system can communicate with a collision alert device that can provide an alert to a driver, if present, or record an indication of the potential collision event in association with a timestamp of the time the potential collision event occurred.

By implementing the systems and methods described herein, collision detection systems can accurately and efficiently detect potential collision events, while overcoming noise issues present in conventional object detection systems. Moreover, this solution can be implemented in a vehicle in real-time, and is therefore capable of identifying potential collision events before they occur, improving driver safety and the quality of autonomous driving systems.

As will be described below, a computing device can perform image analysis techniques in a real-time driving environment. In a non-limiting example, the computing device can receive data from an image capture device mounted on a vehicle that is driving. The computing device can then perform the image analysis techniques described herein to identify and provide alerts for potential collision events between the vehicle to which the image capture device is mounted and any detected obstacles in the path of the vehicle. FIG. 1A depicts an example environment that includes example components of a system in which a computing device can detect potential collision events. Various other system architectures that may include more or fewer features may utilize the methods described herein to achieve the results and outputs described herein. Therefore, the system depicted in FIG. 1A is a non-limiting example.

FIG. 1A illustrates a system 100, which includes components of a collision detection system 105 for tracking objects to detect a potential collision with a vehicle 110. The system 100 can include a vehicle 110, a collision detection system 105, and a potential obstacle 145 (here depicted as a vehicle). The collision detection system 105 can include a computing device 115, an image capture device 135, and a collision alert device 140. The computing device 115 can include a computer storage 120, which can store one or more frames 125 received from the image capture device 135 and one or more transformation matrices 130 generated by the computing device 115, as described herein. The system 100 is not confined to the components described herein and may include additional or other components, not shown for brevity, which are to be considered within the scope of the embodiments described herein.

The vehicle 110 can be any type of vehicle, such as a car, truck, sport-utility-vehicle (SUV), motorcycle, semi-tractor trailer, or other vehicle that can be driven or navigate an environment that includes one or more obstacles (e.g., such as the obstacle 145, etc.). The vehicle 110 can be operated by a user, or in some implementations, can include an autonomous vehicle control system (not pictured) can that navigate the vehicle 110 or provide navigation assistance to an operator of the vehicle 110. As the vehicle 110 operates, it may encounter obstacles, such as the obstacle 145. Although the obstacle 145 is depicted herein as another vehicle, it should be understood that the obstacle 145 could be any sort of obstacle 145 that the vehicle 110 may encounter during normal operations of the vehicle 110.

As shown, the vehicle 110 can include a collision detection system 105, which can be used to detect potential collision events before they occur using the image processing techniques described herein. As outlined above, the collision detection system 105 can include a computing device 115. The collision detection system 105 can include at least one processor and a memory, (e.g., a processing circuit, etc.). The memory (e.g., the storage 120, other computer memory, etc.) can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof.

The memory may include, but is not limited to, electronic, optical, magnetic, or any other storage or transmission device capable of providing the processor with program instructions. The instructions may include code from any suitable computer programming language. The computing device 115 can include any or all of the components and perform any or all of the functions of the computer system 150 described herein in conjunction with FIGS. 1B-1C.

The computing system 115 can include a storage 120, which can store one or more frames 125 received from the image capture device 135, and one or more transformation matrices 130 generated as described herein. The storage 120 can be a computer-readable memory that can store or maintain any of the information described herein that is generated, accessed, received, transmitted, or otherwise processed by the computing device 115. The storage 120 can maintain one or more data structures, which may contain, index, or otherwise store each of the values, pluralities, sets, variables, vectors, numbers, or thresholds described herein. The storage 120 can be accessed using one or more memory addresses, index values, or identifiers of any item, structure, or region of memory maintained by the storage 120.

In some implementations, the storage 120 can be internal to the computing device 115. In some implementations, the storage 120 can exist external to the computing device 115, and may be accessed via one or more communications interfaces (e.g., such as those described herein in connection with FIGS. 1B and 1C, etc.). In some implementations, the storage 120 can be distributed across many different storage elements, and may be accessed via a suitable computer bus interface. The computing device 115 (or any components thereof) can store, in one or more regions of the memory of the storage 120, the results of any or all computations, determinations, selections, identifications, generations, constructions, or calculations in one or more data structures indexed or identified with appropriate values. The storage 120 can include or perform any of the features or functionalities of the storage 128 described herein in connection with FIG. 1B.

In addition, the computing system 115 can include one or more communications interfaces that can communicate wirelessly with other devices. The communications interfaces of the computing system 115 can include, for example, a Bluetooth communications device, or a 5G/LTE cellular data communications device. The one or more communications interfaces can be used to communicate with other computing devices, such as those that can configure the computing system 115. The computing system 115 can include or in be in communication with one or more sensors, including a global-positioning system (GPS) receiver, an accelerometer sensor, a gyroscope, a magnetometer, or any other type of inertial sensor. Using signals captured by the GPS receiver or motion sensors, the computing system 115 can estimate the speed of the vehicle 110. For example, by periodically taking GPS measurements, and measuring the difference between two position measurements over time, the computing system 115 can estimate an average velocity of the vehicle 110.

The collision detection system 105 can include an image capture device 135, which can be, for example, any sort of camera capable of capturing one or more frames 125. In some implementations, the image capture device 135 is a video camera capable of producing a video stream. The frames 125 can be, for example, an image that is associated with a particular timestamp in a videos stream. The image capture device 135 can be mounted on the vehicle 110 that includes the collision detection system 105. For example, the image capture device 135 can be positioned on or near the windshield of the vehicle such that the image capture device 135 captures images (e.g., the frames 125, etc.) of the environment in front of the vehicle. The image capture device 135 can be used to capture frames 125 that include or depict one or more obstacles 145 with which the vehicle 110 could potentially collide. The image capture device 135 may be integrated into the vehicle (e.g., into a front bumper) or may be an aftermarket component (e.g., affixed to a windshield or dashboard).

The frames 125 captured by the image capture device 135 can include one or more pixels, and can be communicated to the computing device 115 via one or more communications interfaces. For example, in some implementations, the computing device 115 can request or retrieve the frames 125 from the image capture device 135, which can then transmit the frames 125 to the computing device 115 for processing and storage. The frames 125 can be any sort of image file, or can form a part of an image stream of any suitable codec or format. Each frame 125, when captured, can be associated with a timestamp identifying the time at which the frame 125 was captured.

Each frame 125 can include pixels arranged in a grid that makes up the frame 125, where each pixel includes color data and location data that identifies the color and location of the pixel in the frame 125. In some implementations, the image capture device 135 can capture the frames 125 in one or more different color channels (e.g., each channel corresponding to a particular color wavelength). In some implementations, the image capture device 135 can be a camera or video capture device that captures non-visible light (e.g., infrared light, etc.). Each color channel in a pixel of a frame 125 can identify the intensity of a particular color of the pixel. These color intensity values (e.g., the color of each pixel in a frame 125, etc.) can be provided as input to the various image processing techniques described herein.

The computing device 115 can perform object detection techniques, including object feature tracking, using the frames 125 captured by the image capture device 135. These object tracking and image processing techniques are described herein in further detail in connection with FIGS. 2-4. In general, the computing device 115 can combine several image processing and object detection techniques to achieve an improved change in scale value of an obstacle 145 between two or more frames 125. Based on the change in scale of the obstacle 145 as shown in the frames 125, the computing device can estimate a time-to-collision value. An approach to calculating the change in scale of a detected object includes generating a transformation matrix 130. The transformation matrix 130 can specify a transformation, such as a rotation and/or a translation, from one set of points of interest in a first frame to a second set of points of interest in a second frame. Each set of points of interest can correspond to similar features of an object (e.g., the obstacle 145, etc.) depicted in each frame 125.

Figure 3B:
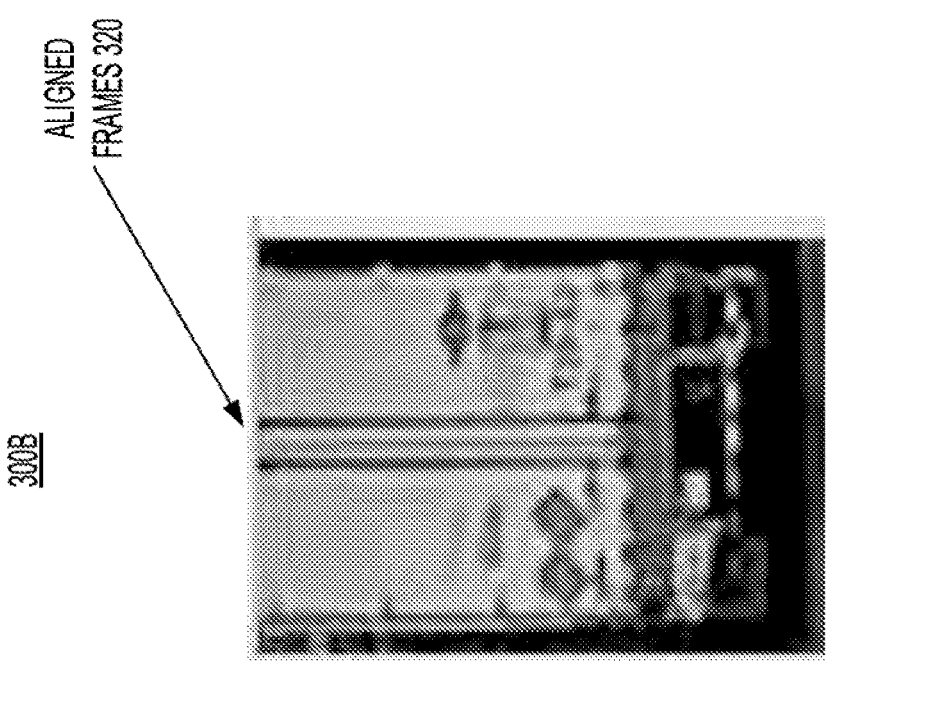
FIGS. 3A and 3B depict graphical representations of an image alignment technique used herein for tracking objects to detect a potential collision with a vehicle, according to an embodiment.
Figure 3A:
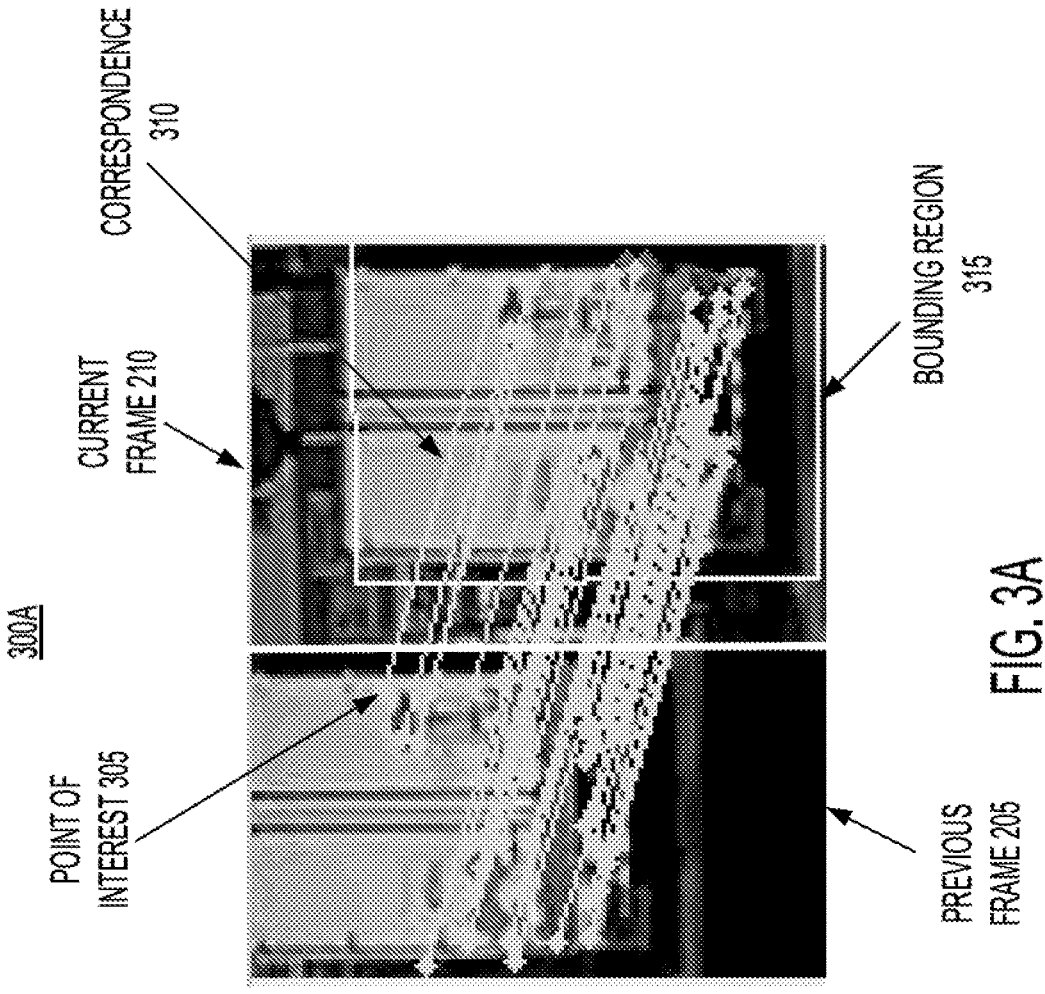

The transformation matrix 130, therefore, can specify one or more transformations that align features of a first frame to a second, subsequent frame. In some implementations, the points of interest can be filtered down to only those that fall within a bounding box corresponding to a detected obstacle in each frame. In such implementations, the transformation matrix can specify one or more transformations that align features present in a first bounding box of a first frame to a second bounding box of a second frame. An example depiction of detecting feature correspondence and performing image alignment using a transformation matrix is depicted in FIGS. 3A-3B. An example representation of a transformation matrix is included below:

$$T = \begin{bmatrix} \cos(\theta)s & -\sin(\theta)s & tx \\ \sin(\theta)s & \cos(\theta)s & ty \end{bmatrix}$$

Where T is the transformation matrix, s corresponds to a uniform scale value, $\theta$ corresponds to an amount of rotation (e.g., in radians, degrees, etc.), and/x and ty correspond to translation in the x and y directions, respectively.

The transformation matrix 130 above can specify transformations to images in a single plane (e.g., one degree of rotation, translation only in two dimensions, etc.). The uniform scaling value s can be calculated using the object detection and tracking techniques described herein (e.g., described in detail in connection with FIGS. 2-4, etc.). The computing device 115 can use the scaling factor in the following equation to calculate an estimated time-to-collision:

$$t = \frac{1}{S-1}\Delta t$$

Where t is the time to collision, s is the scaling factor, and $\Delta t$ is the amount of time that has passed between capturing the two frames that were used to calculate the scaling factor s. The time-to-collision value can be considered a time-to-collision score, which can represent an estimated time, considering the current operating conditions (e.g., velocity, etc.) remains constant, that the vehicle 110 will impact an object (e.g., the obstacle 145, etc.) represented in the frames 125.

The computing device 115 can iteratively calculate the time-to-collision value, for example, each time a frame 125 is captured by the image capture device 135 and received by the computing device 115. Each of the transformation matrices 130 and the time-to-collision values calculated by the computing device 115 can be stored in the storage 120 in association with the respective frames 125 from which the transformation matrix 130 and the time-to-collision values were calculated. Once calculated, the computing device 115 can compare the time-to-collision value to a threshold value.

The threshold value can be a predetermined metric, which can indicate that the driver of the vehicle, or an autonomous vehicle navigation system, should be notified that a potential collision event is likely. The threshold value can be, for example, 2.1 seconds. However, this value is an example value, and other threshold numbers are possible. The threshold value can be specified, for example, in an internal configuration setting of the computing device 115 (e.g., stored in the memory, etc.), and in some implementations can be configured by a user of the computing device 115 via one or more input devices, as described herein.

Based on the comparison, the computing device 115 can determine whether the calculated time-to-collision value satisfies the threshold value stored by the computing device 115. For example, if the estimated time-to-collision value is less than the threshold value, the computing device 115 can determine that the threshold has been satisfied. In some implementations, the computing device 115 determines that the time-to-collision value calculated for an obstacle 145 is less than the threshold for a predetermined number of frames. As described herein above, the computing device 115 can calculate the time-to-collision iteratively, for example, for each frame 125 captured by the image capture device 135.

Thus, in some implementations the computing device 115 can compare each time-to-collision value calculated for each frame 125 to the threshold, and increment a counter each time a time-to-collision value is less than the threshold. In some implementations, the counter can be reset of a time-to-collision value for the most-recently captured frame 125 is not less than or equal to the threshold. The counter, therefore, tracks the number of consecutive frames in which an object having a time-to-collision value that is less than the threshold is detected. If the computing device 115 detects that the number of consecutive frames exceeds a predetermined number, the computing device 115 can determine that the potential collision threshold has been satisfied.

Once the computing device 115 has determined that the threshold has been satisfied, the computing device 115 can transmit a collision signal to a collision alert device 140. The collision signal can include information that indicates a potential collision event could occur if action is not taken. The collision signal can be transmitted to the collision alert device 140, for example, via one or more communication interfaces, such as a dashboard, heads-up display, mobile phone, audio speaker, vibration mechanism, and light display, as described in connection with FIGS. 1B-1C. The collision signal can include, for example, the time-to-collision value(s) that satisfied the potential collision threshold. In some implementations, when transmitting the collision signal, the computing device 115 can store the information in the collision signal (e.g., the time-to-collision, etc.) in association with the frame(s) 125 from which the time-to-collision value was calculated, and the timestamp corresponding to the respective frames 125. In some implementations, the collision signal can include a class (e.g., a classification, category, type, etc.) of obstacle 145 that triggered the collision signal.

The collision alert device 140 can be a device that alerts a driver of a potential collision event in response to a collision signal. For example, the collision alert device 140 can produce a light (e.g. a flashing light powered by the collision alert device 140, etc.), an auditory alarm, or another type of output that prompts the driver to operate the vehicle 110 to mitigate or avoid the potential collision event and/or causes a user to attend to the collision alert device 140. The collision alert device 140 can itself be a computing device. For example, in some implementations, the collision alert device 140 can form a part of the computing device 115. In some implementations, the collision alert device 140 can form a part of an autonomous vehicle navigation system. For example, the collision alert device 140 can be a software or a hardware component that monitors for collision signals from the computing device 115. The collision alert device 140 can receive the collision signals from the computing device 115, and cause the autonomous vehicle navigation system to perform a corrective action (e.g., brake, swerve, etc.).

In some implementations, the collision alert device 140 can be integrated with one or more interfaces of the vehicle 110, that provide information about a condition of the vehicle. For example, the vehicle 110 can include one or more sensors or computing devices that can provide signals to external computing devices (e.g., the collision alert device 140, etc.) via a communications interface, such as a control area network (CAN) bus or an on-board diagnostics interface.

The communications interface of the vehicle 110 can provide signals that indicate, for example, the vehicle 110 is currently braking. In some implementations, if the collision alert device 140 receives a collision signal from the computing device 115 while the collision alert device 140 detects the vehicle 110 is braking, the collision alert device 140 can suppress the collision signal (e.g., a flashing light, auditory signal, etc.). In some implementations, the computing device 115 itself can receive an indication that the vehicle 110 is braking via the communications interface of the vehicle 110, and suppress the transmission of the collision signal to the collision alert device 140. The object detection and tracking techniques used to of estimate time-to-collision events, as outlined above, are described in greater detail herein below in FIG. 2.

The methods described herein for tracking objects to detect a potential collision with a vehicle may be implemented using the computing environment described in connection with FIGS. 1B and 1C.

Figure 1B:
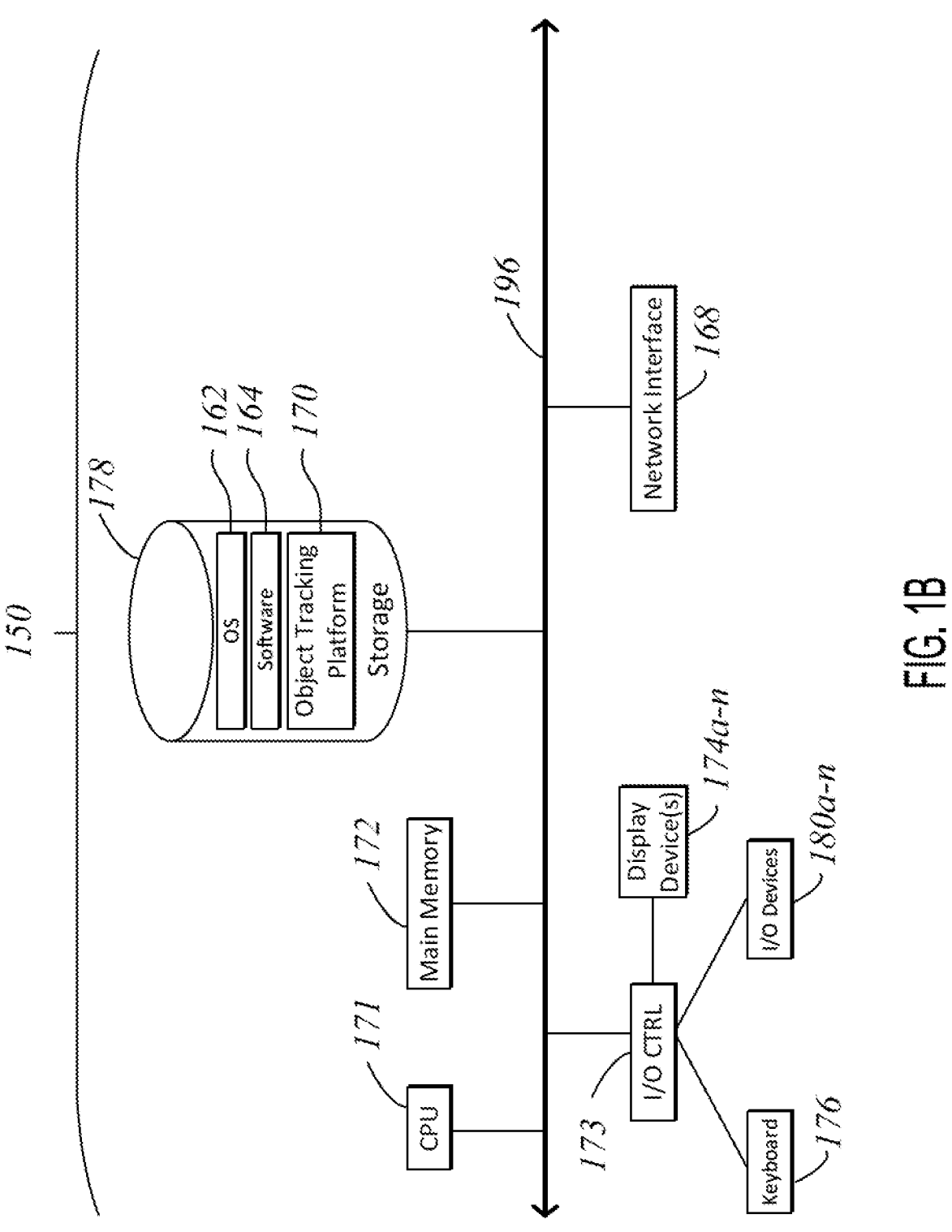
FIGS. 1B and 1C are block diagrams depicting computing devices useful in connection with the methods and systems described herein, according to an embodiment.

As shown in FIG. 1B, a computer system 150 may include a storage device 178, a network interface 168, an input/output (I/O) controller 173, display devices 174a-174n, as well as input devices, such as a camera 176. The camera 176 can include, for example, a single-lens reflex camera (SLR), a digital SLR (DSLR) camera, or any other type of image or video capture device. The storage device 178 may include, without limitation, an operating system (OS) 162, software 164, and an object tracking platform 170, which can implement any of the features of the collision detection system 105 described above in connection with FIG. 1A. As shown in FIG. 1C, each computer system 150 may also include additional optional elements, e.g., a memory port 182, a bridge 198, one or more I/O devices 180a-180n (generally referred to using reference numeral 180), and a cache memory 194 in communication with the central processing unit 171.

The central processing unit 171 is any logic circuitry that responds to and processes instructions fetched from the main memory unit 172. The central processing unit 171 may be provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The central processing unit 171 can include processing devices manufactured by Qualcomm of San Diego, California. The computer system 150 may be based on any of these processors, or any other processor capable of operating as described herein. The central processing unit 171 may utilize instruction level parallelism, thread level parallelism, different levels of cache, and multi-core processors. A multi-core processor may include two or more processing units on a single computing component.

Main memory unit 172 may include one or more memory chips capable of storing data and allowing any storage location to be directly accessed by the microprocessor 171. Main memory unit 172 may be volatile and faster than storage 178 memory. Main memory units 172 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 172 or the storage 178 may be non-volatile; e.g., non-volatile read access memory (NVRAM), flash memory non-volatile static RAM (nvSRAM), Ferro-electric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 172 may be based on any of the above described memory chips, or any other available memory chips capable of operating as described herein. In the embodiment shown in FIG. 1B, the processor 171 communicates with main memory 172 via a system bus 196. FIG. 1C depicts an embodiment of a computer system 150 in which the processor communicates directly with main memory 172 via a memory port 182. For example, in FIG. 1C the main memory 172 may be DRDRAM.

Figure 1C:
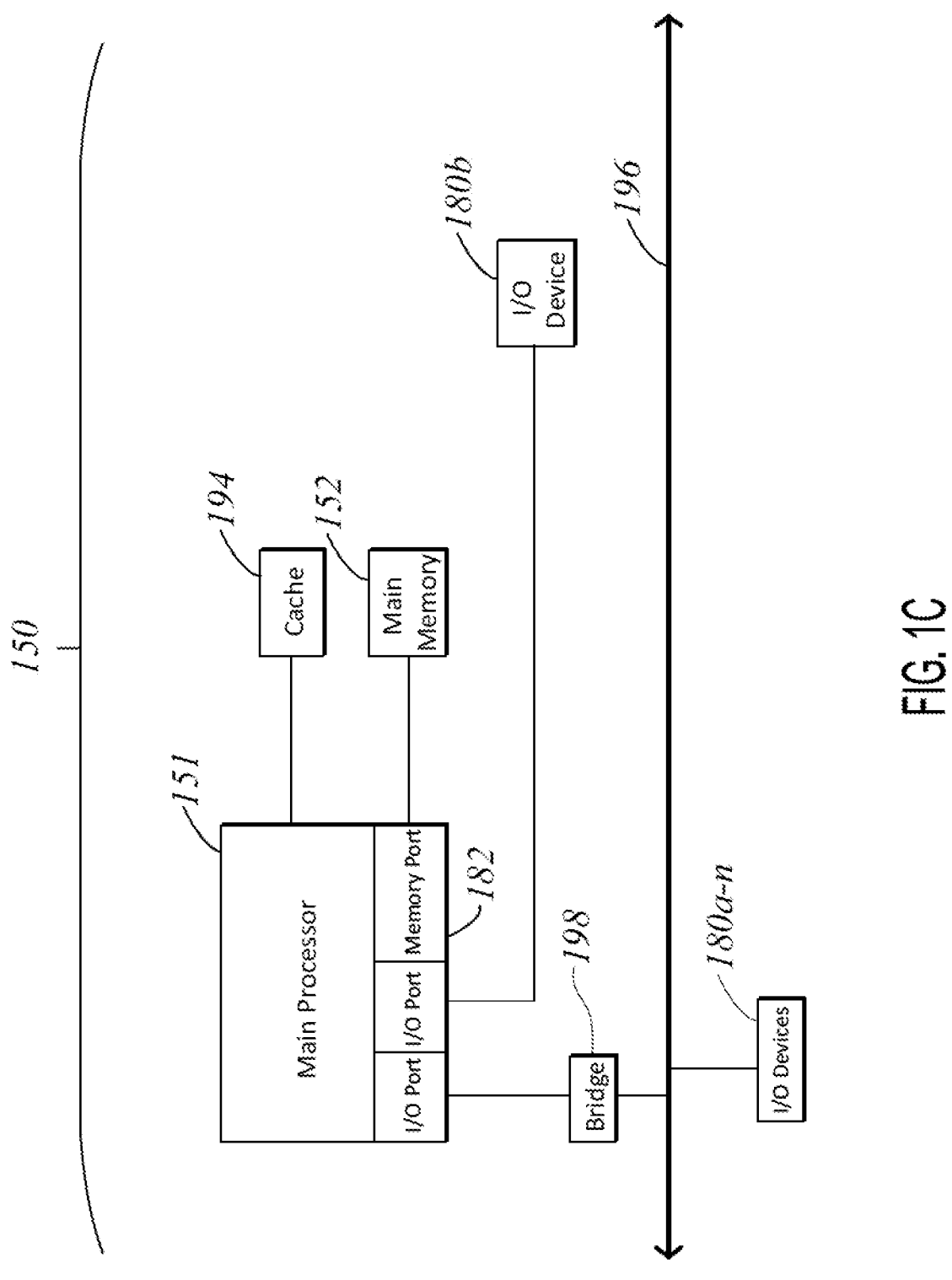

FIG. 1C depicts an embodiment in which the main processor 171 communicates directly with cache memory 194 via a secondary bus, sometimes referred to as a backside bus. In other embodiments, the main processor 171 communicates with cache memory 194 using the system bus 196. Cache memory 194 typically has a faster response time than main memory 172 and is typically provided by SRAM, BSRAM, or EDRAM. In the embodiment shown in FIG. 1C, the processor 171 communicates with various I/O devices 180 via a local system bus 196. Various buses may be used to connect the central processing unit 171 to any of the I/O devices 180, including a PCI bus, a PCI-X bus, or a PCI-Express bus, or a NuBus. For embodiments in which the I/O device includes a video display 174, the processor 171 may use an Advanced Graphics Port (AGP), a high-definition multimedia interface (HMDI) interface, or a DisplayPort interface to communicate with the display 174 or the I/O controller 173 for the display 174. FIG. 1C depicts an embodiment of a computer system 150 in which the main processor 171 communicates directly with I/O device 180b. FIG. 1C also depicts an embodiment in which local buses and direct communication are mixed: the processor 171 communicates with I/O device 180a using a local interconnect bus while communicating with I/O device 180b directly.

A wide variety of I/O devices 180a-180n may be present in the computer system 150. I/O devices 180a-180n can include alarm devices, such as the collision alert device 140 described herein above in connection with FIG. 1A. For example, an I/O device 180 can be an alarm device capable of emitting an auditory signal that can alert a driver to a potential collision event. An example I/O device 180 can be an alarm device that also provides a visual indication when a potential collision event is detected, such as a flashing light or another type of display device. In some cases, configuration of the computing devices described herein can be performed remotely, such as via the network 168, or by local input. In cases were local input is desired to configure the computer system 150, optional input devices 180 can be included. The optional input devices 180 can include keyboards, mice, trackpads, trackballs, or touchpads, among others. In addition, the input devices 180 can include optional sensors that can provide data that may be relevant for detecting potential collision events or monitoring conditions of the vehicle 110. Such sensors can include accelerometers, pressure sensors, magnetometer sensors, angular rate sensors, depth sensors, proximity sensors, ambient light sensors, gyroscopic sensors, or other sensors. Output devices can include alarm devices (e.g., the collision alert device 140 described herein in connection with FIG. 1A), graphical displays, speakers, or other types of devices capable of alerting a driver to a potential collision event.

The I/O devices may be controlled by an I/O controller 173 as shown in FIG. 1B. The I/O controller may control one or more I/O devices, such as the camera 176, which can capture images or video of an environment, for example, in front of a vehicle as described herein in connection with FIG. 1A. Furthermore, an I/O device may also provide storage medium for the computer system 150. In still other embodiments, the computer system 150 may provide USB connections (not shown) to receive handheld USB storage devices, for example, to configure the computer system 150 by providing updates to the operating system 162, the software 164, or the object tracking platform 170. In further embodiments, an I/O device 180 may be a bridge between the system bus 196 and an external communication bus, e.g. a USB bus, a SCSI bus, a FireWire bus, an Ethernet bus, a Gigabit Ethernet bus, a Fibre Channel bus, or a Thunderbolt bus.

In some embodiments, such as embodiments where the collision detection system 105 is integrated with a display present in the vehicle 110, display devices 174a-174n may be connected to I/O controller 173. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, or liquid crystal laser displays. In some embodiments, display devices 174a-174n or the corresponding I/O controllers 173 may be controlled through or have hardware support for OPENGL or DIRECTX API or other graphics libraries.

In some embodiments, the computer system 150 may include or connect to multiple display devices 174a-174n, which each may be of the same or different type and/or form. As such, any of the I/O devices 180a-180n and/or the I/O controller 173 may include any type and/or form of suitable hardware, software, or combination of hardware and software to support, enable or provide for the connection and use of multiple display devices 174a-174n by the computer system 150. For example, the computer system 150 may include any type and/or form of video adapter, video card, driver, and/or library to interface, communicate, connect or otherwise use the display devices 174a-174n. In some implementations, video cards, such as graphics processing units (GPUs), may also be used to perform one or more of the computational tasks set forth herein. In such cases, one or more GPUs may communicate with the main processor 151 via the system bus 196, and process computational workloads, such as the image processing techniques described herein, in parallel with operations performed by the main processor 151.

Referring again to FIG. 1B, the computer system 150 may comprise a storage device 178 (e.g. one or more hard disk drives or redundant arrays of independent disks) for storing an operating system or other related software, and for storing application software programs such as any program related to the object tracking platform 170. The object tracking platform 170 can include executable instructions or hardware, which implements any of the features of the collision detection system 105 described herein below in connection with FIG. 1A. Examples of storage device 178 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. The storage device 178 may be non-volatile, mutable, or read-only. The storage device 178 may be internal and connect to the computer system 150 via a bus 196. The storage device 178 may be external and connect to the computer system 150 via a I/O device 180 that provides an external bus. The storage device 178 may connect to the computer system 150 via the network interface 168 over a network.

In some implementations, the computer system 150 may include a network interface 168 to interface to a network through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computer system 150 communicates with other computer systems 150' (not pictured) via any type and/or form of gateway or tunneling protocol e.g. Secure Socket Layer (SSL) or Transport Layer Security (TLS). The network interface 168 may comprise a built-in network adapter, network interface card, PCMCIA network card, EXPRESSCARD network card, card bus network adapter, wireless network adapter, USB network adapter, modem or any other device suitable for interfacing the computer system 150 to any type of network capable of communication and performing the operations described herein.

A computer system 150 of the sort depicted in FIG. 1C may operate under the control of an operating system, which controls scheduling of tasks and access to system resources. The computer system 150 can be any computing device that can be integrated with or positioned in a vehicle, such as the vehicle 110. The computer system 150 has sufficient processor power and memory capacity to perform the operations described herein. In some implementations, the operations performed herein can be performed on a computing device that is integrated with a vehicle 110, such as an autonomous driving control system that controls or manages other aspects of the operations of the vehicle 110.

Figure 2:
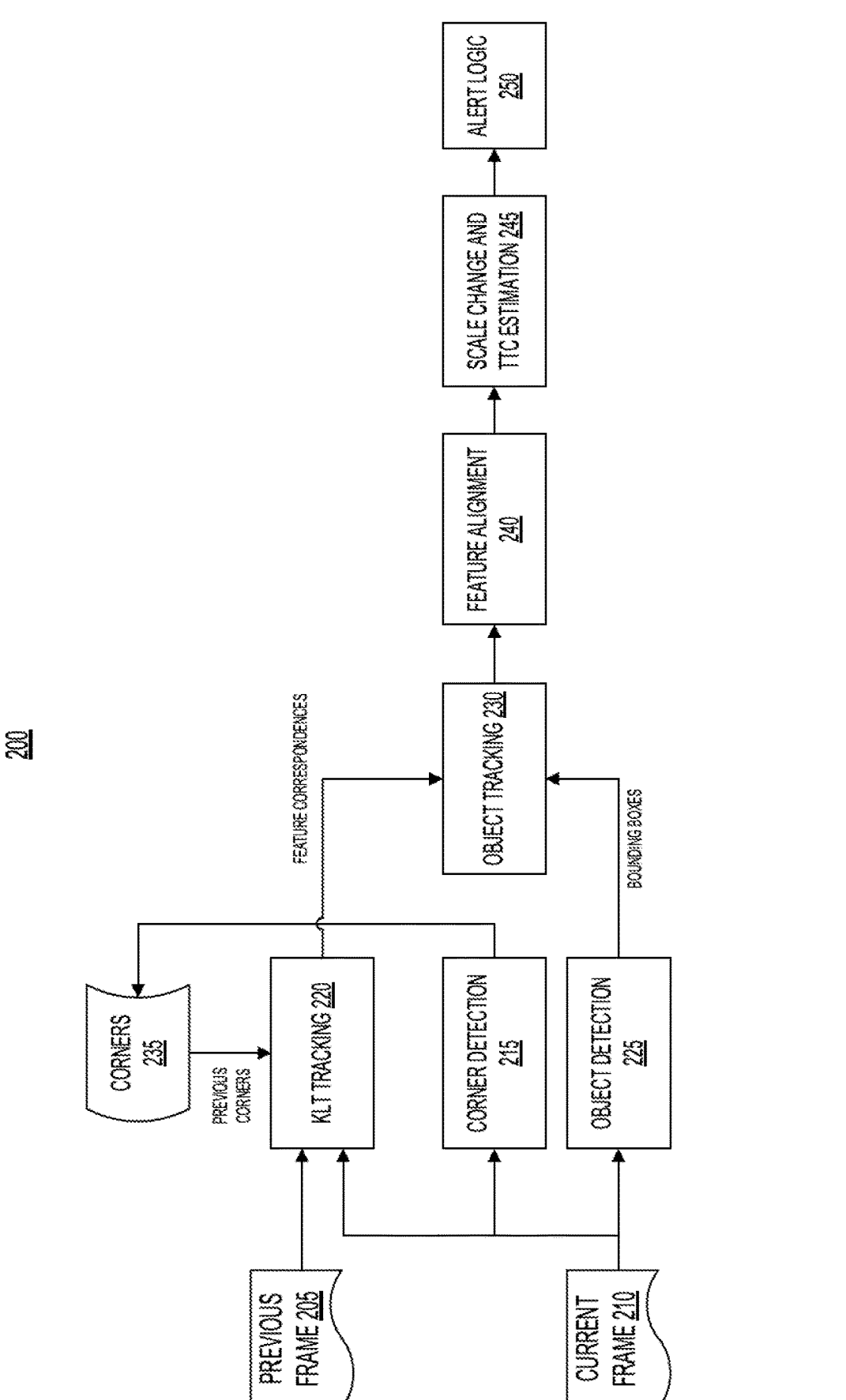
FIG. 2 illustrates a data flow diagram of data flow components implemented by the system depicted in FIG. 1A, according to an embodiment.

Referring now to FIG. 2, illustrated is a data flow diagram 200 of operations implemented by the collision detection system 105 depicted in FIG. 1 to estimate potential collision events based on object detection, in accordance with one or more implementations. The flow diagram includes a corner detection process 215, a Kanade-Lucas-Tomasi (KLT) feature tracking process 220, an objection detection process 225, an object tracking process 230, a feature alignment process 240, a scale change and time-to-collision estimation process 245, and an alert logic process 250. These operations can be performed data, such as the previous frame 205 (e.g., of the frames 125, etc.), the current frame 210 (e.g., the next frame from the previous frame 205 in a sequence of frames 125, etc.), and the corners 235 (e.g., calculated using the corner detection process 215, etc.). The operations depicted in the data flow diagram 200 is described as being executed by a computing device, such as the computing device 115 described in FIG. 1).

In some implementations, the data flow diagram 200 can be a pipeline algorithm, where certain processes can be calculated in parallel (e.g., leveraging parallel processing techniques, etc.), while certain processes can also benefit from pipeline parallelism. For example, each of the object detection process 225, the corner detection process 215, and the KLT feature tracking process 220 can be performed in parallel. Likewise, the object tracking process 230, the feature alignment process 240, the scale change and time-to-collision estimation process 245, and the alert logic process 250 can use pipeline parallelism to improve computational performance.

At the start of the data flow diagram 200, the computing device can receive at least two frames (e.g., a first frame and a second frame, etc.) that are captured by a capture device (e.g., the capture device 135, etc.) mounted to a vehicle (e.g., the vehicle 110). As shown, each of these frames are the previous frame 205, which can form a part of a sequence of frames (e.g., a sequence of the frames 125, etc.), and the current frame 210, which can be the next frame captured by the capture device after the previous frame 205 has been captured. In other words, the computing device can begin the processes shown in the data flow diagram 200 when at least two sequential frames have been captured (e.g., the previous frame 205 and the current frame 210). When another frame in the sequence is captured by the image capture device, the current frame 210 can then replace the previous frame 205 and become the "new" previous frame 205, and the newly captured frame received from the image capture device can become the "new" current frame 210. The previous frame 205 can be used as input to the KLT feature tracking process 220. The current frame 210 can be used as input to the object detection process 225, the corner detection process 215, and the KLT feature tracking process 220.

The computing device can use a corner detection process 215 to identify points of interest in the current frame 210. The corner detection process 215 can perform image analysis on the current frame 210 to compute a set of Harris corners for the current frame 210. Because corners can indicate interesting, or informationally rich, regions of an image, the corner detection process 215 can be used to calculate the points of interest of each region. Because corners, or portions of an image, are more informationally rich, they can more easily be mapped and tracked between consecutive frames in a sequence. The corner detection process 215 can use a Harris corner detection technique to identify the corners in each frame. Harris corner detection techniques can identify pixels in a frame that have large variations in the neighborhood (e.g., neighboring pixels) of the pixel.

The Harris corner detection algorithm includes passing a window (e.g., selecting a group of pixels in a predetermined, rectangular grouping in a frame centered around a selected pixel, etc.) over each pixel (or a subset of pixels) in a frame. For each window, the computing device can calculate the variation (e.g., using one or more Sobel filters, etc.) in the pixels within the window in both the x and y directions. If significant variation is detected (e.g., greater than a threshold, etc.) in both the x and y directions, the computing device can identify the pixel at the center of the window as a point of interest in the frame. In some implementations, the Harris Corner detection algorithm (and the KLT feature tracking process 220 that follows) can be performed after the object detection process 225 described in greater detail below. In such implementations, the corner detection process 215 and the KLT feature tracking process 220 can be performed on each bounding region corresponding to a detected object in the current frame 210.

When the corner detection process 215 is complete, the corners for the current frame 210 can be stored (e.g., in the memory of the computing device, etc.) as the corners 235. As described herein above, when a new frame is received from the image capture device, the current frame 210 is stored as a new previous frame 205 (e.g., the old previous frame 205 is discarded or overwritten), and the new frame becomes the new current frame. However, the corner detection process 215 and the KLT feature tracking process 220 operate in parallel, meaning that the corners generated by the corner detection process 215 are not immediately used as input to the KLT feature tracking process 220. Instead, the detected set of corners can be stored in the memory of the computing device until a new frame is received, and the current frame 210 used to calculate the corners 235 is stored as the previous frame 205. Thus, as depicted, the corners 235 used as input to the KLT algorithm actually correspond to the previous frame 205 when the KLT feature tracking process 220 is executed, as described herein.

The computing device can use the KLT feature tracking process 220 to track correspondences between any identified points of interest in two consecutive frames (e.g., the previous frame 205 and the current frame 210). The KLT feature tracking algorithm can be used to identify or otherwise track the amount by which points of interest in the previous frame 205 move over time (e.g., as depicted in the current frame 210). In general, the KLT feature tracking process 220, given a point of interest in the previous frame 205 and image data of the previous frame 205 and the current frame 210, identifies the location of the same feature identified by the point of interest (e.g., a similar image feature such as a corner, which can represent a feature of an object represented by the image, etc.) in the current frame 210. The displacement between the locations of the point of interest in the previous frame 205 to the current frame 210, taken together with the calculated displacement of other points of interest, can be used to generate a transformation matrix (e.g., a transformation matrix 130, etc.). The transformation matrix, as described above, can align the features depicted in the previous frame 205 onto similar features depicted in the current frame 210.

To do so, the computing device can perform the KLT feature tracking process 220 using the local windows, or regions, around the positions of each corner 235 computed for (what is now) the previous frame 205. For example, each of the corners 235 can be associated with a respective position in two-dimensional space, and can correspond to a respective pixel in the previous frame 205. For each corner 235, the computing device can select a window of pixels in the previous frame 205 around the position of the selected corner 235. The computing device can then perform the KLT algorithm for a specified number of iterations (e.g., a predetermined number, etc.) to compute the translation between the point of interest in the previous frame 205 to the position of the point of interest in the current frame 210. The computing device can repeat this process until a corresponding position for a second set of points of interests in the current frame 210 have been calculated.

Each point of interest in the second set can correspond to a point of interest in the first set (e.g., detected using the corner detection process 215 on the previous frame 205, etc.). The displacements between the points of interest detected in the previous frame 205 and the second set of points of interest identified in the current frame can be stored as a set of feature correspondences. In some implementations, the feature correspondences can also include the positions of each point of interest in the previous frame 205 and the current frame 210. The feature correspondences can be provided as input into the object tracking process 230 described in further detail herein.

The computing device can perform the object detection process 225 to detect one or more objects in the frames received from the image capture device. As shown, the object detection process 225 can take the current frame 210 as input. In some implementations, the object detection process 225 can be performed in parallel with other processes depicted in the data flow diagram 200. The object detection process 225 can utilize one or more deep neural networks (DNNs) that can classify one or more obstacles (e.g., an obstacle 145, etc.) depicted in the current frame 210. In addition, the object detection process 225 can identify a bounding box around each detected object in the current frame 210.

The object detection process 225 can utilize one or more DNNs for object classification. DNNs are neural networks that can include one or more layers, such as fully connected layers, convolutional layers, and other types of layers. In general, object classification can be performed using an object classification model that includes a feed-forward neural network that outputs over a softmax layer. The softmax layer can output a vector of probability values that each correspond to the likelihood that a frame (e.g., the current frame, etc.), or a portion of a frame, is classified as including a particular feature. The features themselves can be encoded by position in the output softmax vector.

The object classification models can be specifically trained using training data of images of obstacles of interest. For a computing device deployed in a driving environment, this can mean training the object classification model to classify different vehicle characteristics (e.g., make, model, vehicle type, etc.), or characteristics of other relevant obstacles, such as road signs, pedestrians, or bicycles, among others. The object classification model can be trained using back-propagation techniques in an offline process, and subsequently deployed as part of the operations of the collision detection system 105 as described herein for inference.

To detect obstacles in the current frame, the object detection process 225 can first utilize a model to generate one or more regions of interest in the current frame that could potentially correspond to an obstacle. Then, the pixels from each region of interest can be extracted and provided as input to the object classification model, as described herein above. In some implementations, the object detection process 225 can utilize one or more convolutional layers to extract features from the current frame 210. The features can be stored as a feature vector corresponding to the current frame 210. Then, the convolutional vector can be provided into both the object classification model described herein above (which, in some implementations, can form a part of the model that generates the feature vector, etc.) and a bounding box regression model.

The bounding box regression model can be, for example, a region proposal network. A region proposal network can itself be a neural network, such as a fully convolutional network, which can predict the object bounds (e.g., bounding regions, etc.) of objects in the current frame 210, and can be trained end-to-end with the other models or layers described herein to improve accuracy. The bounding region can be, for example, a bounding box identified by a position, a width, and a height. In some implementations, the bounding region can be identified by coordinates corresponding to each of the corners of the bounding region. Thus, the object detection process 225 can take the current frame 210 as input, and detect and classify one or more objects in the current frame, along with boundary coordinates of bounding regions that correspond to each detected object. In some implementations, the object detection process 225 can process a predetermined region of the current frame 210, such as a region of the current frame 210 that represents the path of travel of the vehicle to which the capture device is mounted. The object detection process 225 can therefore perform bounding box regression on objects that the vehicle is likely to collide with (e.g., in the vehicle's driving path), rather than any obstacle detected in any region of the current frame 210. Likewise, the object detection process 225 may process more or substantially all of the current frame 210 and may subsequently select among the candidate object detections based on a predetermined region of the current frame corresponding to the vehicle's path of travel. The classification and bounding regions of each object detected in the current frame can be provided to the object tracking process 230, as described herein.

The computing device can use the object tracking process 230 to filter the feature correspondences generated by the KLT feature tracking process 220 using the bounding regions generated by the object detection process 225. The object tracking process 230 can perform this filtering for each object detected in the current frame. For example, for each point of interest identified in the current frame 210 as corresponding to one of the corners 235 detected in the previous frame 205, the computing device can determine whether the point of interest falls within one of the bounding regions detected by the object detection process 225, as described above. If the point of interest falls within the bounding region, the point of interest can be stored in association with an identifier of the bounding region to which it corresponds (e.g., for later access when performing alignment, etc.). In addition, the corresponding point of interest in the previous frame 205 can be stored in association with the identifier of the bounding region. In some implementations, the points of interest can be filtered by both points of interest that call within the bounding region detected in the current frame 210 that correspond to points of interest that fall within a bounding region detected for the same class of obstacle in the previous frame 205. This process can be repeated for each point of interest identified from the current frame 210, resulting in a set of one or more bounding regions with sets of feature correspondences (e.g., point of interest pairs between the current frame 210 and the previous frame 205) associated therewith. The computing device can use this resulting data as an input to the feature alignment process 240 as described herein.

In some implementations, the computing device can store the object classification for each detected object in the current frame 210 for use in the following iteration (e.g., when the current frame 210 becomes the previous frame 205, and a new frame is used as the current frame 210, etc.) of the collision detection process. In the following iteration, the object tracking process 230 can compare the classification of each object in the previous frame 205 (e.g., from the previous iteration, etc.) to the classification of each object in the current frame 210 produced as output by the object detection process 225 as described herein above. If the classifications of one or more objects do not match (e.g., a classification failure has occurred, etc.), the computing device can store an indication of a detection failure event in association with a timestamp corresponding to when the current frame 210 was captured by the capture device. The classification of a corresponding object detected changing between frames indicates a classification failure because objects should not change in classification over time (e.g., a vehicle type should never change for a detected vehicle, etc.). In such failure circumstances, the computing device can "reset" the pipeline, or interrupt the processing flow by clearing the previous frame 205, and accepting a new current frame 210 from the capture device, and beginning the process flow depicted in the diagram 200 as if it were the first iteration.

Likewise, the object tracking process 230 can also detect circumstances where generating a transformation matrix (e.g., performing image alignment, etc.) has, or would, fail. For example, in some implementations, a predetermined number of point correspondences must fall within a bounding region corresponding to an object to generate a transformation matrix. If less than the predetermined number of point correspondences are present, the computing device can store an indication of a detection failure event in association with a timestamp corresponding to when the current frame 210 was captured by the capture device. As above, in such failure circumstances, the computing device can "reset" the pipeline, or interrupt the processing flow by clearing the previous frame 205, and accepting a new current frame 210 from the capture device, and beginning the process flow depicted in the diagram 200 as if it were the first iteration.

Once the computing device has filtered the points of interest to those that fall within the bounding regions corresponding to detected obstacles, the computing device can use the feature alignment process 240 to generate a transformation matrix (e.g., the transformation matrix 130, etc.) for each bounding region. The transformation matrix can specify a transformation, such as a linear transformation, that can be used to align the set of points of interest identified in the previous frame 205 (e.g., those that correspond to the points within the bounding region in the current frame 210) to those identified in the current frame 210. This process can be completed for every bounding region detected in the current frame 210, such that a transformation matrix is generated for each bounding region. In some implementations, a transformation matrix can be generated for just one bounding region, such as the bounding region of an object that is detected as closest to, and/or within the same lane as, the vehicle to which the capture device is mounted. Generating the transformation matrix can include estimating the parameters of the transformation matrix, which as outlined above can have the form of:

$$T = \begin{bmatrix} \cos(\theta)s & -\sin(\theta)s & tx \\ \sin(\theta)s & \cos(\theta)s & ty \end{bmatrix}$$

Where T is the transformation matrix, the parameter s corresponds to a uniform scale value, the parameter $\theta$ corresponds to an amount of rotation (e.g., in radians, degrees, etc.), and the parameters/x and ty correspond to translation in the x and y directions, respectively. Note that the translation matrix provided as an example above can apply to detected objects that are co-planar (e.g., only having one dimension of rotation, and two dimensions of translation). However, in some implementations, the transformation matrix can be expanded to include a robust affine transformation matrix, with additional degrees of rotation.

To calculate the parameters of the transformation matrix (e.g., the rotation $\theta$, the translation tx and ty, and the scaling factor s, etc.), the computing device can perform a fitting algorithm from the points of interest in the previous frame 205 and the current frame 210. For example, the fitting algorithm can be a random-sample consensus (RANSAC) algorithm. A fitting algorithm can be used to fit each of the parameters above by minimizing the overall error (e.g., Euclidean distance or displacement, etc.) between the points of interest in the previous frame 205 when mapped to the points of interest in the current frame 210. The fitting algorithm can therefore be iteratively computed, first by selecting initial values for each of the parameters to be estimated, and iteratively changing each parameter according to the fitting algorithm to minimize the error.

Once the error is below a predetermined threshold, or a predetermined number of fitting iterations have been completed, the fitting algorithm can be considered completed, and a transformation matrix for the next bounding region can be computed, if not all bounding regions have been processed. In some implementations, if the fitting algorithm does not arrive at a solution where the error is below a predetermined threshold after a predetermined number of iterations. In such circumstances, the computing device can store an indication of a detection failure event in association with a timestamp corresponding to when the current frame 210 was captured by the capture device. As above, in such failure circumstances, the computing device can "reset" the pipeline, or interrupt the processing flow by clearing the previous frame 205, and accepting a new current frame 210 from the capture device, and beginning the process flow depicted in the diagram 200 as if it were the first iteration.

As described above, the transformation matrix can be used to align the previous frame 205 with the current frame 210 such that the points of interest in the previous frame 205 overlap those of the current frame 210. An example depiction of such an alignment process using the feature correspondences is described herein below in connection with FIGS. 3A and 3B.

Referring to FIGS. 3A and 3B, depicted are graphical representations of the feature matching and the image alignment techniques used herein for tracking objects to detect a potential collision with a vehicle, in accordance with one or more implementations. As shown in the view 300A of FIG. 3A, a series of points of interest 305 in the previous frame 205 can be mapped (represented by the respective correspondence 310) to a corresponding point of interest in the current frame 210. At this stage, the points of interest have been filtered such that only the correspondences that fall within a bounding region 315 surrounding the obstacle (shown here as the back of a truck), are shown.

These point correspondences 310 can be used to generate a transformation matrix for the bounding region 315. Note that each point of interest in the previous frame 205 and the current frame 210 correspond to physical features of the obstacle as depicted in the previous frame 205 and the current frame 210. This transformation matrix can be applied, for example, to each of the pixels of the previous frame 205, thereby aligning the features of the previous frame 205 with the features of the current frame 210 that fall within the bounding region 315. A result of this alignment is shown in FIG. 3B. As shown in the view 300B of FIG. 3B, the pixels of the previous frame 205 can be aligned to the pixels in the current frame 210, creating the aligned frames 320. The aligned frames 320 have been cropped according to the bounding region 315. As shown, the previous frame 205 and the current frame 210 are each shown at about 50% opacity, however, because corresponding features are aligned accurately using the generated transformation matrix, the aligned frames 320 appear to be a single image. Because the feature mapping within the bounding region 315 produces accurate results, the scaling parameter s in the generated transformation matrix can be used to compute a more accurate time-to-collision value than other techniques.

Referring back now to FIG. 2, the computing device can use the transformation matrix generated using the feature alignment process 240 as input to the scale change and time-to-collision estimation process 245. As describe above, the uniform scaling value s can be calculated using the fitting techniques described above, as part of generating the transformation matrix. When executing the scale change and time-to-collision estimation process 245, the computing device can use the scaling factor in the time-to-collision equation outlined above and reproduced below to calculate an estimated time-to-collision:

$$t = \frac{1}{S-1}\Delta t$$

Where t is the time to collision, s is the scaling factor as extracted from the transformation matrix, and $\Delta t$ is the amount of time that has passed between capturing the two frames that were used to calculate the scaling factor s. The time-to-collision value can be considered a time-to-collision score, which can represent an estimated time, considering the current operating conditions (e.g., velocity, etc.) remains constant, that the vehicle 110 will impact an obstacle (e.g., the obstacle 145, etc.) represented by pixels in the current frame 210 and the previous frame 205. This time-to-collision score can then be provided to alert logic process 250, which can determine whether to transmit a collision signal to a collision alert device (e.g., the collision alert device 140, etc.).

In some implementations, the scale change and time-to-collision estimation process 245 can provide a smoothing function over the time-to-collision values calculated using the scaling factor extracted from the transformation matrix. For example, to reduce overall noise, the computing device can take a rolling average of the time-to-collision value between two or more frames. In some implementations, other filtering techniques can be used, such as a Kalman filter. Thus, in some implementations, the computing device can store an initial time-to-collision value until a predetermined number of sequential time-to-collision values have been estimated by the scale change and time-to-collision estimation process 245. These values can be estimated, as described herein above, as each frame is received from the capture device mounted on the vehicle. The computing device can then update a filtered time-to-collision value as each new time-to-collision value is estimated based on each new frame. For example, the filtered time-to-collision value can be a rolling average value (e.g., for a predetermined number of values, etc.), or can be produced as output from a Kalman filter. In implementations where filtering processes are used, the updated filtered time-to-collision value can be provided to the alert logic process 250 for processing.

Once the time-to-collision value has been estimated, the computing device can execute the alert logic process 250 to determine whether the time-to-collision value satisfies a potential collision event threshold. As described herein above, threshold value can be predetermined metric, which can indicate the driver of the vehicle, or an autonomous vehicle navigation system, should be notified that a potential collision event is likely. The threshold value can be a predetermined value, for example, 2.1 seconds. If the estimated time-to-collision value is less than the threshold value, the computing device can determine that the threshold has been satisfied. In some implementations, the computing device determines that the time-to-collision value calculated for an obstacle is less than the threshold for a predetermined number of frames (e.g., iterations of the flow diagram 200).

As described above, in some implementations, the computing device can compare each time-to-collision value calculated for each current frame 210 to the threshold, and increment a counter each time a time-to-collision value is less than the threshold. In some implementations, the counter can be reset of a time-to-collision value for the most-recently captured current frame 210 is not less than or equal to the threshold. The counter, therefore, tracks the number of consecutive frames in which an object having a time-to-collision value that is less than the threshold is detected. If the computing device determines that the number of consecutive frames exceeds a predetermined number, the computing device can determine that the potential collision threshold has been satisfied.

If the computing device determines that the time-to-collision value satisfies the threshold, the computing device can transmit a collision signal to a collision alert device. The collision signal can include information that indicates a potential collision event could occur if action is not taken (e.g., by a driver of the vehicle, or by an autonomous vehicle navigation system, etc.). The collision signal can be transmitted to the collision alert device via one or more communication interfaces, as described herein above. The collision signal can include, for example, the time-to-collision value (s) that satisfied the potential collision threshold. In some implementations, when transmitting the collision signal, the computing device can store the information in the collision signal (e.g., the time-to-collision, etc.) in association with the current frame 210 and/or the previous frame 205 from which the time-to-collision value was calculated, and the timestamp corresponding to the current frame 210 and/or the previous frame 205. In some implementations, the collision signal can include a class (e.g., a classification, category, type, etc.) of obstacle that triggered the collision signal.

Figure 4:
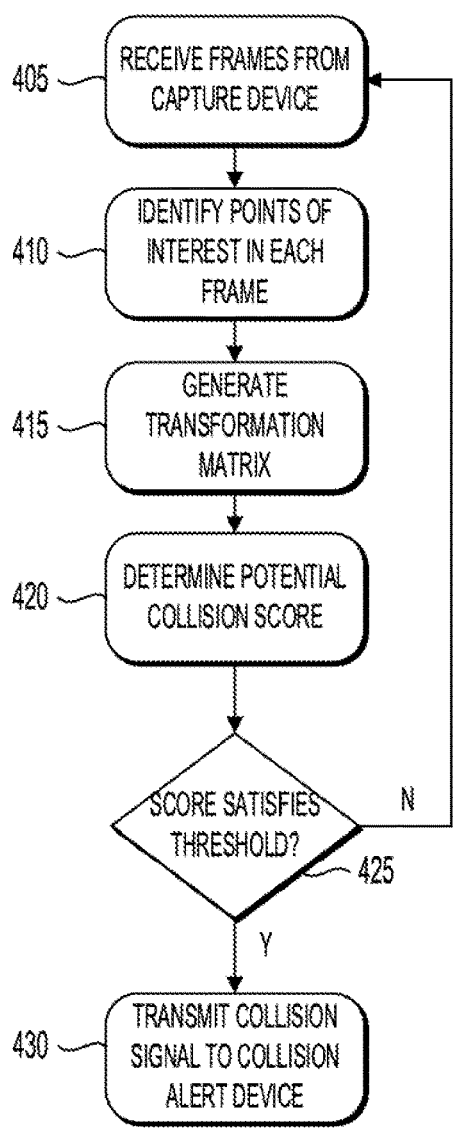
FIG. 4 illustrates a flow of a method executed in a system for tracking objects to detect a potential collision with a vehicle, according to an embodiment.

FIG. 4 illustrates a flow of a method 400 executed in a system (e.g., the collision detection system 205, etc.) for tracking objects to detect a potential collision with a vehicle, in accordance with one or more implementations. The method 400 includes steps 405-430. However, other embodiments may include additional or alternative steps, or may omit one or more steps altogether. The method 400 is described as being executed by a computing device, such as the computing device 115 described herein above.

At step 405, the computing device can receive frames (e.g., the frames 125) captured by a capture device (e.g., the image capture device 135, etc.) mounted to a vehicle (e.g., the vehicle 110, etc.). As described herein above, the computing device can compute transformation matrices and time-to-collision estimations generally, between at least two consecutive frames of a stream of frames, such as from a video stream. This method can be computed iteratively each time a frame is received from the image capture device, such that the most-recent two frames are used to track potential obstacles and compute time-to-collision estimates as described herein above in connection with FIGS. 1A-1C and 2.

At step 410, the computing device can identify points of interest in each of the two frames undergoing analysis. For example, the computing device can use a corner detection process, such as a Harris corner detection algorithm as described herein above; to identify points of interest in a frame as it is received by the image capture device. The resulting corners can indicate interesting, or informationally rich, regions of a frame, and therefore can be more likely to map to corresponding features in frames as they are received. Each of the corners detected in the frame can be identified as the points of interest that are subsequently mapped to the other frames captured by the capture device.

To identify points of interest in a consecutive frame (e.g., a second frame after a first frame in the sequence of frames captured by the image capture device, etc.), the computing device can track the points of interest identified in the first frame into the consecutive frame. To do so, the computing device can perform a KLT feature tracking technique (e.g., such as the KLT feature tracking process 220 described herein above) to match the points of interest identified in the first frame to similar features identified in the second frame. As described herein above, the computing device can use local windows, or regions, around the positions of points of interest computed for the first frame. The local window can be a region of pixels (e.g., a region having a predetermined shape or size, etc.) that surrounds each point of interest in the first frame. Each local window can depict a particular feature of the first frame.

Using the KLT algorithm, the computing device can calculate a displacement of the feature depicted in the window between the first frame and the second frame. The amount of this displacement can then be mapped to the coordinate space of the second frame (e.g., by adding the displacement to the location of the point of interest in the first frame) to identify a point of interest in the second frame that corresponds to the same feature as the point of interest in the first frame. Each pair of points of interest identified by the computing device can be referred to as a point correspondence. The computing device can repeat this process for each point of interest identified in the first frame to identify a corresponding second set of points of interest in the second frame. If a point of interest in the first frame cannot be mapped to a corresponding point of interest in the second frame, the computing device can discard (e.g., ignore in further processing steps, etc.), the point of interest.

At step 415, the computing device can generate a transformation matrix (e.g., a transformation matrix 130, etc.) that specifies a transformation of the first plurality of points of interest to the second plurality of points of interest. As described in greater above detail in connection with FIG. 2, the computing device can generate a transformation matrix for each obstacle detected in the first frame and a consecutive frame (sometimes referred to as a second frame) in the sequence of frames received from the capture device. To do so, the computing device can first perform an object detection process (e.g., the object detection process 225) using one or more of the first frame or the second frame.

The object detection algorithm can utilize one or more DNNs that can classify one or more obstacles in the first frame and/or the second frame. The computing device can also identify a bounding region around each detected object in the first frame or the second frame. The bounding region can be a region that identifies a boundary of the obstacle as detected in the frame undergoing object detection. To classify objects, the computing device can use one or more DNNs for object classification. As described in greater detail herein above, object classification can be performed using an object classification model that includes a feed-forward neural network that outputs can output a likelihood that a particular obstacle (e.g., vehicle type, road sign, pedestrian, bicycle, etc.) is present in a frame.

In some implementations, the computing device can detect and classify multiple obstacles in a single frame. In addition, the computing device use a bounding box regression model, as described in greater detail herein above in connection with FIG. 2, to estimate a bounding region surrounding each obstacle in the frame. The size of the bounding region can correspond to the size of the obstacle as depicted the frame undergoing object detection. The classification and bounding regions of each object detected in each frame can then be used in object tracking and alignment processes to generate a transformation matrix for each object.

Once the objects in the first frame and/or the second frame have been detected, the computing device can filter the point correspondences between the first frame and the second frame by selecting subset of the points of interest that fall within the bounding region corresponding to an object. This process can be repeated for each object detected in the frames using the object detection process. As described in greater detail herein above in connection with FIG. 2, the computing device can determine whether each point of interest in a frame falls within one of the bounding regions detected by the object detection process. If the point of interest falls within the bounding region, the point of interest can be stored in association with an identifier of the bounding region to which it corresponds (e.g., for later access when performing alignment, etc.).

Likewise, if a corresponding bounding region has been detected in the second frame, the computing device can determine whether the corresponding point of interest identified in the second frame falls within a corresponding bounding region detected in the second frame. In some implementations, if each pair of points of interest fall within the corresponding bounding regions detecting in the corresponding consecutive frames, the computing device can store each point of interest in association with the bounding region to which it corresponds, as above. This process can be repeated by the computing device for each point of interest that has been identified in the first and second frames, resulting in a set of points of interest associated with each object detected in both the first and the second frames.

Once the sets of points of interest have been identified for each tracked object, the computing device can generate the transformation matrix that specifies the transformation from the points of interest in the first frame to the positions of the corresponding points of interest in the second frame. To do so, and as described in detail above in connection with the feature alignment process 240 of FIG. 2, the computing device can perform a fitting algorithm to compute the parameters (e.g., uniform scaling, rotation, and translation, etc.) of the transformation matrix. The fitting algorithm can be an iterative fitting algorithm that optimizes the parameters of a model, here the parameters of the transformation matrix, to minimize an error value. Here, the error value can be the displacement between the set of points of interest corresponding an obstacle detected in the first frame and the corresponding set of points of interest corresponding to the obstacle detected in the second frame.

The fitting algorithm can be considered completed for a particular object when the overall error value is below a predetermined threshold within a predetermined number of iterations. The computing device can compute a transformation matrix using a fitting algorithm to estimate the parameters of the transformation matrix for each obstacle detected in the both the first frame and the second frame. As described herein above, the fitting algorithm, and therefore generation of the transformation matrix, can fail if the error value does not fall below a predetermined error threshold within a predetermined number of iterations. In such circumstances, the computing device can store an indication of a detection failure event in association with a timestamp corresponding to when the frame was captured by the capture device. When completed, the uniform scaling factor can be used in connection with the equations described herein to compute an estimated time-to-collision.

At step 420 determine, based on the transformation matrix, a score corresponding to a potential collision event. The score can correspond to an estimated amount of time to a potential collision event between the vehicle to which the capture device is mounted and an obstacle detected in one or more frames captured by the capture device. As described herein above, the time-to-collision score for an obstacle can be determined using the uniform scaling parameter s from the transformation matrix generated for that obstacle detected in the first and second frames. The uniform scaling factor s in transformation matrix can be a measure of the overall change in uniform size in the obstacle between the first frame and the second frame. As described herein above, the score can be computed using the following equation:

$$t = \frac{1}{S-1} \Delta t$$

where t is the time to collision, s is the scaling factor, and $\Delta t$ is the amount of time that has passed between capturing the two frames that were used to calculate the scaling factor s. In some implementations, the computing device can apply one or more filters to the time-to-collision score. For example, as additional frames are processed using the method 400 (e.g., according to the process flow diagram 200 described herein in connection with FIG. 2, etc.) the computing device can generate additional translation matrices for each additional frame (e.g., each two consecutive frames in sequence as described herein, etc.). As additional translation matrices are generated, the computing device can calculate and update the time-to-collision score. In some implementations, the computing device can store each time-to-collision score in a sequence that corresponds to the sequence of frames captured by the capture device. In such implementations, the computing device can apply one or more filters, such as a Kalman filter or a rolling average, to the sequence of time-to-collision values to calculate one or more filtered time-to-collision scores.

At step 425, the computing device can determine whether the calculated time-to-collision value satisfies a potential collision threshold value. This process is described in further detail above in connection with the alert logic process 250 of FIG. 2. For example, if the estimated time-to-collision value is less than the threshold value, the computing device can determine that the threshold has been satisfied. In some implementations, the computing device determines that the time-to-collision value calculated for an obstacle is less than the threshold for a predetermined number of frames. The computing device can calculate the time-to-collision iteratively, for example, for each frame captured by the capture device. In some implementations, if the computing device determines that a number of consecutive frames have time-to-collision values that are less than the potential collision threshold (e.g., less than 2.1 seconds, etc.); the computing device can determine that the potential collision threshold has been satisfied. If the computing device determines that the potential collision threshold has been satisfied, the computing device can perform step 430. If the computing device determines that the potential collision threshold has not been satisfied, the computing device can continue to receive frames captured by the capture device at step 405.

At step 430, the computing device can transmit a collision signal to a collision alert device (e.g., the collision alert device 140, etc.) responsive to the score satisfying a potential collision event threshold. Satisfying the collision event threshold may include the score being equal to or exceeding a predetermined collision event threshold. As described herein above, the collision signal can include, for example, the time-to-collision value(s) that satisfied the potential collision threshold, and can be transmitted to the collision alert device via a collision detection threshold. In such cases, satisfying the collision event threshold may include the time-to-collision value(s) being equal to or less than a predetermined collision event threshold. In addition, the computing device can store the information in the collision signal (e.g., the time-to-collision, etc.) in association with the frames used to calculate the time-to-collision value and a timestamp corresponding to the when each of the frames were captured. In some implementations, the results of an image alignment process can be stored (e.g., the feature alignment process 240 described herein in connection with FIG. 2 and shown in FIGS. 3A and 3B, etc.) In some implementations, the collision signal can include a class (e.g., a classification, category, type, etc.) of one or more obstacles that triggered the collision signal.

Figure 5:
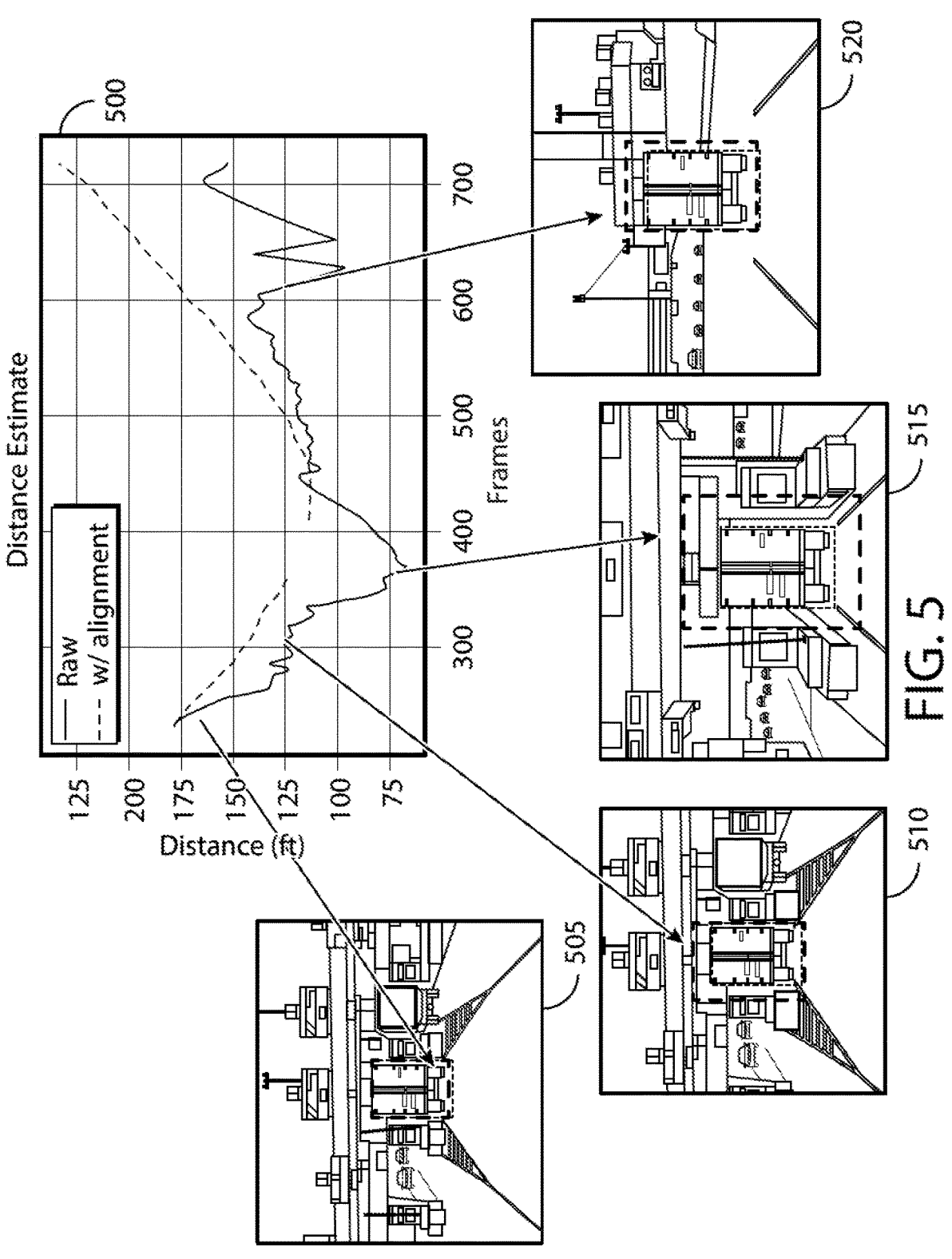
FIG. 5 illustrates a graph of example estimated-distance data that compares conventional object tracking techniques to the improved object tracking techniques described herein, according to an embodiment.
Figure 6:
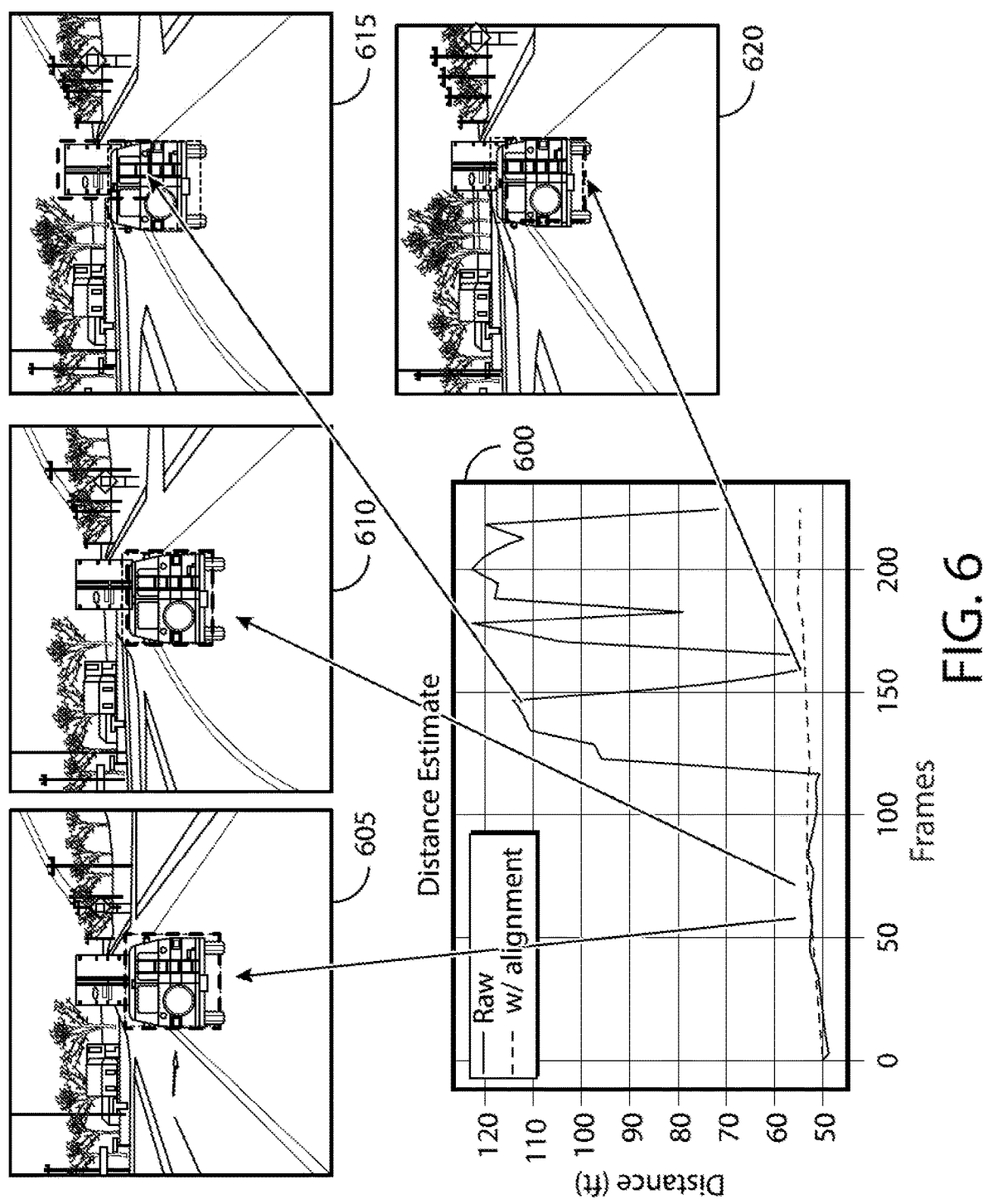
FIG. 6 illustrates a graph of example estimated-distance data that compares conventional object tracking techniques to the improved object tracking techniques described herein in a scenario that includes two vehicles, in accordance with an embodiment.

The following description of FIGS. 5 and 6 relate to experimental data that is not intended to be limiting to the capabilities of the techniques described herein. The data is provided purely for example purposes to show technical improvements over conventional object tracking systems. Referring to FIG. 5, illustrated is a graph 500 of example estimated-distance data that compares conventional object tracking techniques to the improved object tracking techniques described herein. As shown, the graph 500 is annotated with frames 505, 510, 515, and 520 at various points of the "raw" estimated distance curve on the graph 500. Each of the frames 505, 510, 515, and 520 were used in part to generate the respective estimated distance of the tracked object in the graph 500.

Two curves are shown in the graph 500, a solid-line curve corresponding to the "raw" estimated distance of a tracked object using conventional object tracking techniques, and a dashed-line "w/alignment" curve that corresponds to the same object tracked across the same frames using the improved object tracking techniques described herein. Likewise, the heavy dashed-line bounding box surrounding the tracked object (in this example, the semi-truck) corresponds to the estimated bounding box based on the output of a neural network that processed a single frame. Localization errors in each frame may contribute noise to the "raw" estimated distance curve on the graph 500. In contrast, the light dashed-line bounding box is a bounding box from a previous frame that is transformed using the object tracking techniques (e.g., the transformation matrix) described herein. As shown, the light dashed-line bounding box more closely tracks the true dimensions of the tracked object in the frames 505, 510, 515, and 520. Likewise, the corresponding "w/alignment" curve is less noisy, and more accurate, than the estimated distance represented by the solid-line "raw" curve.

Similar improvements are shown in FIG. 6, which illustrates a graph 600 of example estimated-distance data that compares conventional object tracking techniques to the improved object tracking techniques described herein in a scenario that includes two vehicles. Similar to the graph 500 shown in FIG. 5, the graph 600 includes a solid-line curve corresponding to the "raw," estimated distance of a tracked object using estimates of its location from neural network processing of single frames followed by conventional object tracking techniques. The dashed-line curve represents the estimated distance of the object using the improved techniques described herein.

As indicated across the frames 605, 610, 615, and 620, which each correspond to respective distance measurements in the graph 600, tracking a potential obstacle when multiple obstacles are present can be challenging when using conventional techniques. In particular, conventional bounding box detection techniques may detect an obstacle improperly. As shown, the heavy dashed-line bounding box, which is detected using conventional tracking techniques, appears to track the van properly across frames 605, 610, and 620. However, the tracking fails at frame 615, and tracks the semi-truck instead of the van. Corresponding inconsistencies in the estimated distance of the object are shown in the solid-line curve.

In contrast, the light dashed-line bounding box, which is a bounding box from a previous frame that is transformed using the object tracking techniques described herein, tracks the van consistently throughout each of the frames 605, 610, 615, and 620. As shown in the dashed-line curve on the graph 600, the estimated distance is similarly consistent and resistant to noise. This is because the improved object tracking techniques limit the features that are aligned between frames to those that fall within bounding boxes of the closest detected object to the camera. So if the bounding box of the first vehicle corresponds to the actual extent of the first vehicle in the first frame, then the corners that the system attempts to match in the second frame are limited to roughly the extent of the first vehicle. In contrast, if the bounding box of the first vehicle is larger than the actual extent of the first vehicle in the first frame, so that it captures both vehicles, then the subsequent feature matches in the second frame will be limited to corners that move together, which are generally corners that belong to only one vehicle or obstacle.

Additional example experimental data is provided in the following table, which indicates various error modes that were detected across 1221 putative forward collision warnings generated using single frame neural-network-based object detection and conventional object tracking techniques. Of the 1221 forward collision warnings, only 720 were valid forward collision warnings. The top error mode was caused by a "breathing bounding box" phenomenon, which is illustrated by the heavy dashed-line bounding box across the frames 505, 510, 515, and 520 of FIG. 5. The third most-frequent error mode was "bad tracking," which is illustrated across the frames 605, 610, 615, and 620 of FIG. 6. In addition, certain systems and methods described herein may address the "already braking" error mode by suppressing forward collision warnings when a braking signal is detected from a vehicle interface.

TABLE 1

| Error Modes Detection in Conventional Detection Techniques | |
| --- | --- |
| Error Mode | Number of Occurrences |
| VALID | 720 |
| TBD | 307 |
| box_breathing | 186 |
| Already_braking | 137 |
| Bad_tracking | 94 |
| Bad_cal | 51 |
| false_detection | 22 |
| curved_road | 15 |
| too_far | 11 |

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The operations described in this specification can be implemented as operations performed by a data processing apparatus on data stored on one or more computer-readable storage devices or received from other sources.

The terms "data processing apparatus", "data processing system", "client device", "computing platform", "computing device", "user device", or "device" can encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a GPS receiver, a digital camera device, a video camera device, or a portable storage device (e.g., a universal serial bus (USB) flash drive), for example. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, a touchscreen, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the computing devices described herein can each be a single module, a logic device having one or more processing modules, one or more servers, or an embedded computing device.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for more consistently tracking objects through frames of a capture device to detect a potential collision with a vehicle, the method comprising:
   receiving, by one or more processors coupled to memory, a first frame and a second frame captured by a capture device mounted to the vehicle, wherein the second frame is captured after the first frame;
   estimating, by the one or more processors and using a neural network regression model that receives a grid of pixels of the first frame and a grid of pixels of the second frame, a first bounding box around a detected object in the first frame and a second bounding box around the detected object in the second frame;
   identifying, by the one or more processors, a first plurality of points of interest within the first bounding box corresponding to the detected object identified in the first frame, and a second plurality of points of interest within the second bounding box corresponding to the detected object identified in the second frame;
   generating, by the one or more processors, a transformation matrix that specifies a transformation of the first plurality of points of interest to a second subset of the second plurality of points of interest;
   determining, by the one or more processors and based on the transformation matrix, a score corresponding to a potential collision event represented by the first frame and the second frame; and
   activating, by the one or more processors, a collision signal to a collision alert device for an output on a communication interface to a driver of the vehicle responsive to the score satisfying a potential collision event threshold.

2. The method of claim 1, wherein identifying the first plurality of points of interest corresponding to the object identified in the first frame further comprises calculating, by the one or more processors, a plurality of Harris corners for the first frame based on pixels in the first frame.

3. The method of claim 1, wherein generating the transformation matrix further comprises:
   detecting, by the one or more processors, a first region of the first frame corresponding to the object;
   selecting, by the one or more processors, a first subset of the first plurality of points of interest within the first region; and
   calculating, by the one or more processors, the transformation matrix based on the first subset.

4. The method of claim 3, further comprising:
   selecting, by the one or more processors, a second subset of the second plurality of points of interest within a second region of the second frame; and
   calculating, by the one or more processors, a change in scale between the first frame and the second frame based on a displacement between the first subset and the second subset.

5. The method of claim 1, wherein the score comprises an estimated time-to-collision, and wherein determining the score corresponding to the potential collision event further comprises calculating, by the one or more processors, the estimated time-to-collision based on a scaling factor of the transformation matrix.

6. The method of claim 5, further comprising determining, by the one or more processors, that the score satisfies the potential collision event threshold by determining that the estimated time-to-collision is less than the potential collision event threshold.

7. The method of claim 1, further comprising:
   receiving, by the one or more processors, a third frame captured by the capture device;
   generating, by the one or more processors, a second transformation matrix based on the second frame and the third frame; and
   updating, by the one or more processors, the score based on the second transformation matrix.

8. The method of claim 7, further comprising:
   determining, by the one or more processors, a first class of the object as depicted in the second frame and a second class of the object as depicted in the third frame;

comparing, by the one or more processors, the first class of the object as depicted in the second frame to the second class of the object as depicted in the third frame; and storing, by the one or more processors, an indication of a detection failure event in association with a timestamp corresponding to when the second frame was captured by the capture device.

9. The method of claim 1, further comprising:

receiving, by the one or more processors, a third frame captured by the capture device;

determining, by the one or more processors, that calculating a second transformation matrix between the second frame and the third frame has failed; and storing, by the one or more processors, an indication of a detection failure event in association with a timestamp corresponding to when the second frame was captured by the capture device.

10. The method of claim 1, wherein identifying the second plurality of points of interest further comprises executing a Kanade-Lucas-Tomasi (KLT) feature tracking technique based on the first plurality of points of interest.

11. A system for more consistently tracking objects through frames of a capture device to detect a potential collision with a vehicle, the system comprising one or more processors coupled to a non-transitory memory, the one or more processors configured to:

receive a first frame and a second frame captured by a capture device mounted to the vehicle, wherein the second frame is captured after the first frame;

estimate, using a neural network regression model that receives a grid of pixels of the first frame and a grid of pixels of the second frame, a first bounding box around a detected object in the first frame and a second bounding box around the detected object in the second frame;

identify a first plurality of points of interest within the first bounding box corresponding to the detected object identified in the first frame, and a second plurality of points of interest within the second bounding box corresponding to the detected object identified in the second frame;

generate a transformation matrix that specifies a transformation of the first plurality of points of interest to align with a second subset of the second plurality of points of interest;

determine, based on the transformation matrix, a score corresponding to a potential collision event represented by the first frame and the second frame; and activate a collision signal to a collision alert device for an output on a communication interface to a driver of the vehicle responsive to the score satisfying a potential collision event threshold.

12. A computer-readable storage medium comprising instructions which, when executed by a computer, cause the computer to:

receive a first frame and a second frame captured by a capture device mounted to the vehicle, wherein the second frame is captured after the first frame;

estimate, using a neural network regression model that receives a grid of pixels of the first frame and a grid of pixels of the second frame, a first bounding box around a detected object in the first frame and a second bounding box around the detected object in the second frame;

identify a first plurality of points of interest within the first bounding box corresponding to the detected object identified in the first frame, and a second plurality of points of interest within the second bounding box corresponding to the detected object identified in the second frame;

generate a transformation matrix that specifies a transformation of the first plurality of points of interest to align with a second subset of the second plurality of points of interest;

determine, based on the transformation matrix, a score corresponding to a potential collision event represented by the first frame and the second frame; and activate a collision signal to a collision alert device for an output on a communication interface to a driver of the vehicle responsive to the score satisfying a potential collision event threshold.

*     *     *     *     *